United States Patent
Hanaki

(10) Patent No.: US 6,483,204 B2
(45) Date of Patent: Nov. 19, 2002

(54) POWER SUPPLY SYSTEM WITH INFORMATION EXCHANGE BETWEEN PLURAL LOADS AND PLURAL POWER SOURCES

(75) Inventor: Shigeto Hanaki, Hyogo (JP)

(73) Assignees: Mitsubishi Denki Kabushiki Kaisha, Tokyo (JP); Mitsubishi Electric System LSI Design Corporation, Itami (JP)

( * ) Notice: Subject to any disclaimer, the term of this patent is extended or adjusted under 35 U.S.C. 154(b) by 13 days.

(21) Appl. No.: 09/756,218

(22) Filed: Jan. 9, 2001

(65) Prior Publication Data

US 2002/0000793 A1 Jan. 3, 2002

(30) Foreign Application Priority Data

Jun. 30, 2000 (JP) ........................................ 2000-199347

(51) Int. Cl.$^7$ ................................................. H02J 1/10
(52) U.S. Cl. .............................. 307/23; 307/26; 307/29; 307/39; 307/66; 307/72; 307/80; 307/86; 307/150; 713/300
(58) Field of Search .............................. 307/23, 24, 26, 307/29, 34, 38, 39, 40, 66, 72, 80, 86, 150; 713/300, 323

(56) References Cited

U.S. PATENT DOCUMENTS

| | | | |
|---|---|---|---|
| 5,646,508 A | * | 7/1997 | Van Phuoc et al. ............ 320/30 |
| 5,903,764 A | * | 5/1999 | Shyr et al. ...................... 307/64 |
| 5,914,585 A | * | 6/1999 | Grabon .......................... 307/66 |
| 5,936,318 A | * | 8/1999 | Weiler et al. ................... 307/23 |
| 5,959,368 A | * | 9/1999 | Kubo et al. ..................... 307/29 |
| 5,990,575 A | * | 11/1999 | Flaugher ........................ 307/29 |
| 6,078,109 A | * | 6/2000 | Yanagisawa ................... 307/29 |
| 6,151,652 A | * | 11/2000 | Kondo et al. ................... 307/66 |
| 6,225,708 B1 | * | 5/2001 | Furukawa et al. ............. 307/66 |

FOREIGN PATENT DOCUMENTS

| | | | |
|---|---|---|---|
| JP | 2-93812 | 4/1990 | ............. G05F/1/00 |
| JP | 8-106340 | 4/1996 | ............. G06F/1/16 |
| JP | 8-186925 | 7/1996 | ............. H02J/1/00 |
| JP | 10-271230 | 10/1998 | .......... H04M/11/00 |

OTHER PUBLICATIONS

Universal Serial Bus Usage Tables for HID Power Devices, Release 1.0, Nov. 1, 1997 pp. 2–65.
"Smart Battery Charger Specification", SBS Implementer Forum, Dec. 11, 1998, Rev. 1.1.

* cited by examiner

Primary Examiner—Jeffrey Sterrett
(74) Attorney, Agent, or Firm—Burns, Doane, Swecker & Mathis, LLP

(57) ABSTRACT

A notebook-sized personal computer representing consumption-side hardware sends electric power data, which indicates an electric power (including voltage, alternating or direct current, cycle and wave shape) suited to the personal computer, to an electric power supply system through a communication line. In the system, the electric power data of the personal computer is analyzed in an allotter, and the allotter sends electric power data, which indicates an electric power required in the allotter, to an electric power supply adapter through a communication line. The electric power supply adapter converts an electric power received from an electric power company into another electric power matching with the electric power data of the allotter and supplies the converted electric power to the allotter through an electric power line. In the allotter, this converted electric power and an electric power supplied from a battery is once converted into another electric power, and this electric power is converted into an electric power matching with the electric power data of the personal computer. The electric power finally obtained in the allotter is supplied to the personal computer through an electric power line. Therefore, the electric power supply system can be widely used for various types of personal computers having different rated electric powers.

20 Claims, 24 Drawing Sheets

FIG.24
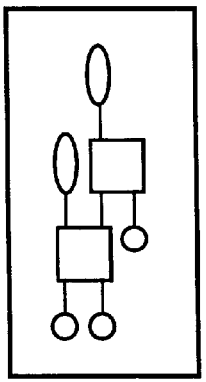
SYSTEMATIC DIAGRAM
(COMBINATION)
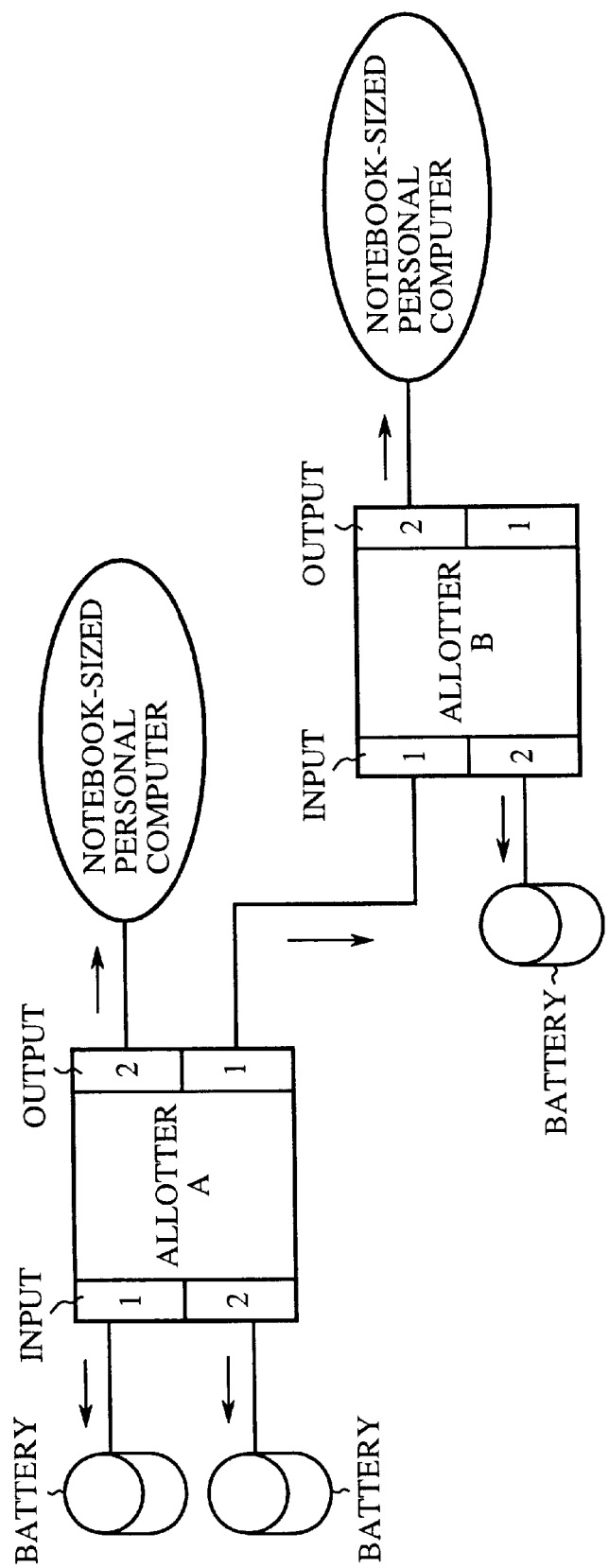

POWER SUPPLY SYSTEM WITH INFORMATION EXCHANGE BETWEEN PLURAL LOADS AND PLURAL POWER SOURCES

BACKGROUND OF THE INVENTION

1. Field of the Invention

The present invention relates to an electric power supply system which has power-side hardware such as an electric power supply adapter, a battery supplying electric power and an allotter allotting electric power and can be widely used for various electronic apparatuses (called consumption-side hardware) having different rated electric powers.

2. Description of Related Art

FIG. 29 is a block diagram showing a conventional electric power supply system arranged in a notebook-sized personal computer. In FIG. 29, 1 indicates a notebook-sized personal computer (hereinafter, called a personal computer). 2 indicates an alternating current (hereinafter called AC) adapter attached to the personal computer 1. In the personal computer 1, 3 indicates a central process ing unit (hereinafter, called CPU), 4 indicates a memory, 5 indicates a smart battery system (SBS), and 6 indicates an electric power supply system. The smart battery system 5 is based on battery management standards of the personal computer 1. The battery management standards are proposed by Intel Corporation and Duracell Inc. in 1994. That is, because a communication function or the like are given to a battery of the smart battery system 5, a battery charger can be widely used for various batteries, the battery has a long-term life, a driving time of a unit operated by using the battery is lengthen, and a charging time required in the battery is shortened. The smart battery system 5 is connected with the CPU 3 through an ISA (industrial standard architecture) bus, the smart battery system 5 is connected with the electric power supply system 6 through a power supply line, and the smart battery system 5 is connected with the CPU 3 and the memory 4 through an electric power line.

Also, in the smart battery system 5, 7 indicates a system host, 8 indicates each of two smart batteries, 9 indicates a smart charger, and 10 indicates a smart selector. In cases where only one smart battery 8 is arranged in the smart battery system 5, the smart selector 10 is not required. Each of the system host 7, the group of smart batteries 8, the smart charger 9 and the smart selector 10 has its internal statuses (for example, a possible electric power to be supplied, a suspension status and a temperature status) and a set of commands, and those are connected with each other through an SM (system management) bus which conforms to I²C bus developed in Philips Corporation and denotes a type of two-wire serial communication. As is described above, because this smart battery system 5 has intelligent functions, the general term "smart" is used in the name of the smart battery system 5.

Next, an operation of the conventional electric power supply system is described.

The smart battery system 5 is connected with the CPU 3 through the ISA bus, internal data of each smart battery 8 is transferred to the CPU 3 through the ISA bus under control of the system host 7, and an instruction of the CPU 3 is received in the system host 7 through the ISA bus to control the smart battery system 5. A battery power is supplied from each smart battery 8 to the CPU 3 and the memory 4 though the electric power line, charging data optimum to the smart battery 8 is transferred from the smart battery 8 to the smart charger 9 to change an output characteristic of the smart charger 9 to a specific output characteristic suited to the smart battery 8. That is, when the charging data sent from the smart battery 8 is received in the smart charger 9, an optimum charging electric power based on the charging data is supplied to the smart battery 8 through a charging line. In this case, because the smart battery system 5 has the plurality of (two in this example) smart batteries 8, the smart selector 10 changes over a group of the SM bus, the charging line and a discharging line between one smart battery 8 and the smart selector 10 to another group of lines between another smart battery 8 and the smart selector 10. This control is performed according to an instruction of the CPU 3 which is received in the system host 7.

Here, other techniques relating to that of this conventional electric power supply system are, for example, disclosed in the Published Unexamined Japanese Patent Applications No. H2-93812 of 1990, No. H8-186925 of 1996, No. H10-271230 of 1998 and No. H8-106340 of 1996.

However, because the conventional electric power supply system has the above configuration, the smart battery system 5 having the system host 7, the group of smart batteries 8, the smart charger 9 and the smart selector 10 has to be arranged in the personal computer 1. Therefore, the weight of the personal computer 1 is increased, and the portability of the personal computer 1 deteriorates. Also, the intelligent functions of the smart battery system 5 arranged in one personal computer 1 cannot be used for another personal computer. Also, the AC adapter 2 is not arranged in the smart battery system 5, the AC adapter 2 corresponding to one type of notebook-sized personal computer has to be prepared for each type of notebook-sized personal computer to privately use each type of AC adapter 2 for the corresponding type of notebook-sized personal computer.

SUMMARY OF THE INVENTION

An object of the present invention is to provide, with due consideration to the drawbacks of the conventional electric power supply system, an electric power supply system, having power-side hardware such as an electric power supply adapter and an allotter, which is widely used for various electronic apparatuses (called consumption-side hardware) having different rated powers.

Also, the object of the present invention is to provide an electric power supply system which is used as one infrastructure of a high speed communication network in which the consumption-side hardware is connected as a terminal apparatus with one of node apparatuses denoting the power-side hardware.

The object is achieved by the provision of an electric power supply system, which is connected with consumption-side hardware consuming an electric power and supplies the electric power required by the consumption-side hardware to the consumption-side hardware, comprising two or more devices, which are connected with each other and are selected from a plurality of devices denoting power-side hardware, to supply an electric power obtained in one device of the electric power supply system to the consumption-side hardware according to electric power data which is received from the consumption-side hardware by using a communication function of the consumption-side hardware, wherein the power-side hardware comprises:

an electric power supply adapter, having a communication function and an electric power adjusting function, for receiving electric power data from one device or the consumption-side hardware, which is connected with the electric power supply adapter on an electric power output side of the electric power supply adapter, by using the communication function, converting an electric power, which is received from an outside of the electric power supply adapter, into another electric power according to the electric power data and outputting the converted electric power to the device or the consumption-side hardware;

an allotter, having a communication function and an electric power adjusting function, for receiving an electric power, which is required in the allotter, from one device connected with the allotter on an electric power input side of the allotter, receiving electric power data from one device or the consumption-side hardware, which is connected with the allotter on an electric power output side of the allotter, by using the communication function, converting the electric power into another electric power according to the electric power data and outputting the converted electric power to the device or the consumption-side hardware. connected with the allotter on the electric power output side of the allotter; and a battery for supplying an electric power to the allotter.

In the above configuration, because the, electric power is supplied from the electric power supply system to the consumption-side hardware according to the electric power data sent from the consumption-side hardware, it is not required to arrange a battery or a charger in the consumption-side hardware. Therefore, the consumption-side hardware can be made lightweight and small in size.

Also, because the battery, the electric power supply adapter and/or the allotter of the electric power supply system can be selected regardless of the type of the consumption-side hardware, the electric power supply system can be widely used for various types of electronic apparatuses of the consumption-side hardware having different rated powers. Therefore, the electric power management based on the information exchange in devices such as the consumption-side hardware, the battery, the electric power supply adapter and the allotter can be fully performed by using the electric power supply system.

It is preferred that the devices of the power-side hardware are connected with each other through an electric cable, and the electric power supply system is connected with the consumption-side hardware through another electric cable.

Therefore, the information exchange in the devices of the power-side hardware and the consumption-side hardware can be reliably performed to supply the appropriate electric power to the consumption-side hardware.

It is also preferred that the electric power supply adapter comprises a communication unit for receiving the electric power data from the device connected with the electric power supply adapter, a control unit for analyzing the electric power data received in the communication unit and an electric power converting unit for converting the electric power supplied from the outside into another electric power specified by the electric power data according to an analysis result of the control unit.

Therefore, the electric power appropriate to any type of consumption-side hardware can be supplied from the electric power supply adapter.

It is also preferred that the allotter is connected with two or more devices of the power-side hardware on the electric power input side of the allotter, and the allotter comprises a communication unit for receiving the electric power data from the device connected with the allotter on the electric power output side of the allotter and transmitting electric power data to the devices connected with the allotter on the electric power input side of the allotter, a control unit for analyzing the electric power data received in the communication unit, two or more input electric power converting units for converting two or more electric powers, which are output from the devices connected with the allotter on the electric power input side of the allotter according to the electric power data sent from the allotter and are received from the devices, into second electric powers which are the same as each other, and an output electric power converting unit for converting the second electric powers converted in the input electric power converting units into a specified electric power according to an analysis result of the control unit.

Therefore, even though a plurality of electric powers are supplied to the allotter, an electric power appropriate to the consumption-side hardware can be supplied to the consumption-side hardware.

It is also preferred that the consumption-side hardware comprises a communication unit for receiving and transmitting electric power data from and to the electric power supply system through a communication line, and a control unit for controlling the communication unit.

Therefore, when the consumption-side hardware sends the electric power data, which indicates an electric power suited to the consumption-side hardware, to the electric power supply system, the consumption-side hardware can receive the electric power from the electric power supply system without privately using an electric power supply adapter or a battery.

It is also preferred that the devices of the powerside hardware are connected with each other through an optical cable, the electric power supply system is connected with the consumption-side hardware through another optical cable, and a multiplexed wave of both an electric power wave carrying the electric power and a data wave denoting the electric power data passes through each of the optical cables.

Because the electric power data passes through the optical cable, a high speed communication can be performed without being inversely influenced by noise based on electromagnetic induction.

It is also preferred that the electric power supply adapter comprises an optical communication unit for receiving a data wave denoting the electric power data from the device connected with the electric power supply adapter and converting the data wave into the electric power data, a control unit for analyzing the electric power data obtained in the communication unit, an electric power converting unit for converting the electric power supplied from the outside into an electric power data denoting a specified electric power according to an analysis result of the control unit, and an optical demultiplexing and multiplexing unit for demultiplexing the multiplexed wave transmitting through the optical cable to obtain the data wave and to send the data wave to the optical communication unit and multiplexing the electric power wave obtained in the electric power converting unit with a data wave output from the optical communication unit.

Therefore, the electric power supply adapter, which functions for the data wave and the electric power wave transmitting through the optical cable, can be obtained.

It is also preferred that the allotter comprises an optical communication unit for receiving a data wave denoting the electric power data from the device connected with the allotter on the electric power output side of the allotter and converting the data wave into the electric power data, a control unit for analyzing the electric power data obtained in the communication unit, an output electric power converting unit for converting an electric power wave received from the device into an electric power wave denoting a specified electric power according to an analysis result of the control unit, and an optical demultiplexing and multiplexing unit for demultiplexing the multiplexed wave transmitting through the optical cable to obtain the data wave and to send the data wave to the optical communication unit and multiplexing the electric power wave obtained in the output electric power converting unit with a data wave output from the optical communication unit.

Therefore, the allotter, which functions for the data wave and the electric power wave transmitting through the optical cable, can be obtained.

It is also preferred that the consumption-side hardware comprises an optical demultiplexing and multiplexing unit. for demultiplexing a multiplexed wave transmitting though the optical cable to obtain an electric power wave denoting the electric power and multiplexing a data wave denoting the electric power data with the multiplexed wave transmitting though the optical cable, an optical communication unit for transmitting the data wave denoting the electric power data to the optical demultiplexing and multiplexing unit, a control unit for controlling the communication unit, and an electric power converting unit for converting the electric power wave obtained in the optical demultiplexing and multiplexing unit into the electric power.

Therefore, the consumption-side hardware, which functions for the data wave and the electric power wave transmitting through the optical cable, can be obtained.

It is also preferred that the consumption-side hardware is connected with the electric power supply adapter, the electric power supply adapter converts the electric power received from the outside into an electric power according to the electric power data received from the consumption-side hardware, and the converted electric power is supplied to the consumption-side hardware.

Therefore, the electric power supply adapter can be widely used for various types of devices representing the consumption-side hardware.

It is also preferred that a battery having a communication function is connected with the electric power supply adapter, the electric power supply adapter converts the electric power received from the outside into an electric power according to electric power data received from the battery, and the converted electric power is supplied to the battery to charge the battery with the converted electric power.

Because the converted electric power is supplied to the battery according to the electric power data of the battery, the electric power supply adapter can be widely used for various types of batteries.

It is also preferred that a plurality of devices of the consumption-side hardware are connected with the electric power supply adapter, the electric power supply adapter converts the electric power received from the outside into an electric power according to electric power data received from one device of the consumption-side hardware for each device, and the converted electric power is supplied to each corresponding device.

Therefore, the electric power supply adapter can be widely used for various types of devices of the consumption-side hardware.

It is also preferred that a plurality of batteries are connected with the allotter on the electric power input side of the allotter, the consumption-side hardware is connected with the allotter on the electric power output side of the allotter, the allotter converts the electric powers received from the batteries into another electric power according to the electric power data received from the consumption-side hardware, and the converted electric power is supplied to the consumption-side hardware.

Therefore, the various types of batteries can be used in common for the consumption-side hardware.

It is also preferred that a plurality of batteries are connected with the allotter on the electric power input side of the allotter, a plurality of devices of the consumption-side hardware are connected with the allotter on the electric power output side of the allotter, the allotter converts the electric powers received from the batteries into another electric power according to the electric power data received from each corresponding device of the consumption-side hardware, and the converted electric power is supplied to each corresponding device of the consumption-side hardware.

Therefore, the various types of batteries can be widely used in common for various types of devices of consumption-side hardware.

It is also preferred that the electric power supply adapter is connected with the allotter on the electric power input side of the allotter, a battery having a communication function is connected with the allotter on the electric power output side of the allotter, the allotter converts the electric powers received from the electric power supply adapter into another electric power according to the electric power data received from the battery, and the converted electric power is supplied to the battery to charge the battery.

Therefore, the battery can be charged by using the allotter as a charger.

It is also preferred that the battery is connected with the allotter on the electric power input side of the allotter, a second battery having a communication function is connected with the allotter on the electric power output side of the allotter, the allotter converts the electric powers received from the battery into another electric power according to electric power data received from the second battery, and the converted electric power is supplied to the second battery to charge the second battery.

Because the electric power of the battery can be transferred to the second battery, residual electric powers of a plurality of batteries can be collected and transferred to the second battery.

It is also preferred that the power-side hardware further comprises an additional allotter, having a communication function and an electric power adjusting function, for receiving an electric power, which is required in the additional allotter, from the allotter connected with the additional allotter on an electric power input side of the additional allotter, receiving electric power data from the consumption-side hardware, which is connected with the additional allotter on an electric power output side of the additional allotter, by using the communication function, converting the electric power into another electric power according to the electric power data and outputting the converted electric power to the consumption-side hardware, and a plurality of serial-additional allotters, respectively having a communication function and an electric power adjusting function, for respectively receiving an electric power, which is required in the serial-additional allotter of a current stage, from the allotter or the serial-additional allotter of a preceding stage connected with the serial-additional allotter of the current stage on an electric power input side of the serial-additional allotter of the current stage, receiving electric power data from the serial-additional allotter of a succeeding stage or the consumption-side hardware, which is connected with the serial-additional allotter of the current stage on an electric power output side of the serial-additional allotter of the current stage, by using the communication function, converting the electric power into another electric power according to the electric power data and outputting the converted electric power to the serial-additional allotter of the succeeding stage or the consumption-side hardware. The allotter is connected with the electric power supply adapter on the electric power input side of the allotter, the allotter is connected with the additional allotter or the serial-additional allotter of the first stage on the electric power output side of the allotter, and the serial-additional allotter of a particular stage is connected with the consumption-side hardware on the electric power output side of the serial-additional allotter. The allotter converts an electric power received from the electric power supply adapter into another electric power according to electric power data received from the additional allotter or the serial-additional allotter of the first stage, and the electric power converted in the allotter is supplied to the additional allotter or the serial-additional allotter of the first stage. The additional allotter converts the electric power converted in the allotter into another electric power according to electric power data received from the consumption-side hardware in cases where the electric power converted in the allotter is supplied to the additional allotter, and the electric power converted in the additional allotter is supplied to the consumption-side hardware. The serial-additional allotter of the current stage converts the electric power converted in the serial-additional allotter of the preceding stage into another electric power according to electric power data received from the serial-additional allotter of the succeeding stage or the consumption-side hardware in cases where the electric power converted in the allotter is supplied to the serial-additional allotter of the first stage, and the electric power converted in the serial-additional allotter of the current stage is supplied to the serial-additional allotter of the succeeding stage or the consumption-side hardware.

Because a plurality of allotters can be arranged in series, an electric power appropriate to each of a plurality of devices of the consumption-side hardware connected with the allotters can be supplied to the corresponding device of the consumption-side hardware.

It is also preferred that the power-side hardware further comprises an additional allotter, having a communication function and an electric power adjusting function, for receiving an electric power, which is required in the additional allotter, from the allotter connected with the additional allotter on an electric power input side of the additional allotter, receiving electric power data from the consumption-side hardware, which is connected with the additional allotter on an electric power output side of the additional allotter, by using the communication function, converting the electric power into another electric power according to the electric power data and outputting the converted electric power to the consumption-side hardware. The allotter is connected with the electric power supply adapter and the battery on the electric power input side of the allotter, and the allotter is connected with the additional allotter or the consumption-side hardware on the electric power output side of the allotter. The allotter requests the electric power supply adapter to output an electric power of which a voltage is equivalent to that of an electric power output from the battery, the allotter converts the electric powers supplied from both the electric power supply adapter and the battery into an electric power according to electric power data sent from the additional allotter or the consumption-side hardware, and the allotter supplies the electric power converted in the allotter to the additional allotter or the consumption-side hardware.

Therefore, even though the electric power supplied from the electric power supply adapter is insufficient in the allotter, because the allotter can receive the electric power from the battery, the allotter can sufficiently obtain the electric power required in the consumption-side hardware.

It is also preferred that the electric power supply system further comprises a connector for connecting the two or more devices of the power-side hardware, which are connected with each other, with the consumption-side hardware to supply an electric power from the power-side hardware to the consumption-side hardware according to electric power data which is transmitted from the consumption-side hardware to the power-side hardware by using the communication function of the consumption-side hardware, wherein the electric power supply system is fixedly arranged with the connector.

Therefore, even though a user leaves his house or office without having his electric power supply adapter or a charger, the user can use the consumption-side hardware by inserting a terminal of a device of the consumption-side hardware into the connector. Also, even though the user goes to a foreign country in which the electric power differs from that of his country, the user can always use the consumption-side hardware. Also, a battery can be charged even though a user leaves his house or office.

The object is also achieved by the provision of an electric power supply system, which is connected with consumption-side hardware consuming an electric power and supplies the electric power required by the consumption-side hardware to the consumption-side hardware, comprising two or more devices, comprising:

one or a plurality of electric power supply adapters, respectively having a communication function using a communication network of a bus type connection, a communication function using an inter-adjacent communication of a tree type connection and an electric power adjusting function, for respectively receiving electric power data according to the communication function using the inter-adjacent communication, converting an electric power, which is received from an outside of the electric power supply adapter, into another electric power according to the electric power data and outputting the converted electric power; and one or a plurality of allotters, respectively having a communication function using the communication network, a communication function using the inter-adjacent communication and an electric power adjusting function, for respectively receiving an electric power, which is required in the allotter, through an electric power input side of the allotter, receiving electric power data through an electric power output side of the allotter according to the communication function using the inter-adjacent communication, converting the electric-power into another electric power according to the electric power data and outputting the converted electric power, wherein the electric power supply adapters and the allotters are connected with a line of the communication network to function as a plurality of node apparatuses, each pair of the node apparatuses adjacent to each other are connected with each other through a line of the inter-adjacent communication, the consumption-side hardware functioning as a terminal apparatus is connected with a remarked node apparatus selected from the node apparatuses, a systematic diagram of the group of node apparatuses in the electric power supply system is prepared in the remarked node apparatus by using the inter-adjacent communication, and the remarked node apparatus specifies a communication route from the remarked node apparatus to each node apparatus, while grasping a position of each node apparatus arranged in the electric power supply system according to the systematic diagram, to communicate between the remarked node apparatus and each node apparatus.

Therefore, the electric power supply system can be used as an infrastructure of a high-speed communication network. Also, because the communication network and the inter-adjacent communication, of which the forms differ from each other, are used for the electric power supply system, the network communication can be flexibly performed, a position of each node apparatus in the electric power supply system can be correctly grasped, and the systematic diagram can be used as a map of the high-speed communication network.

BRIEF DESCRIPTION OF THE DRAWINGS

FIG. 24 is an explanatory view showing the distribution of a systematic diagram of a group of devices in the electric power supply system, to the devices according to the thirteenth embodiment;

DETAILED DESCRIPTION OF THE PREFERRED EMBODIMENTS

The invention will now be described with reference to the accompanying drawings.

Embodiment 1

Figure 1:
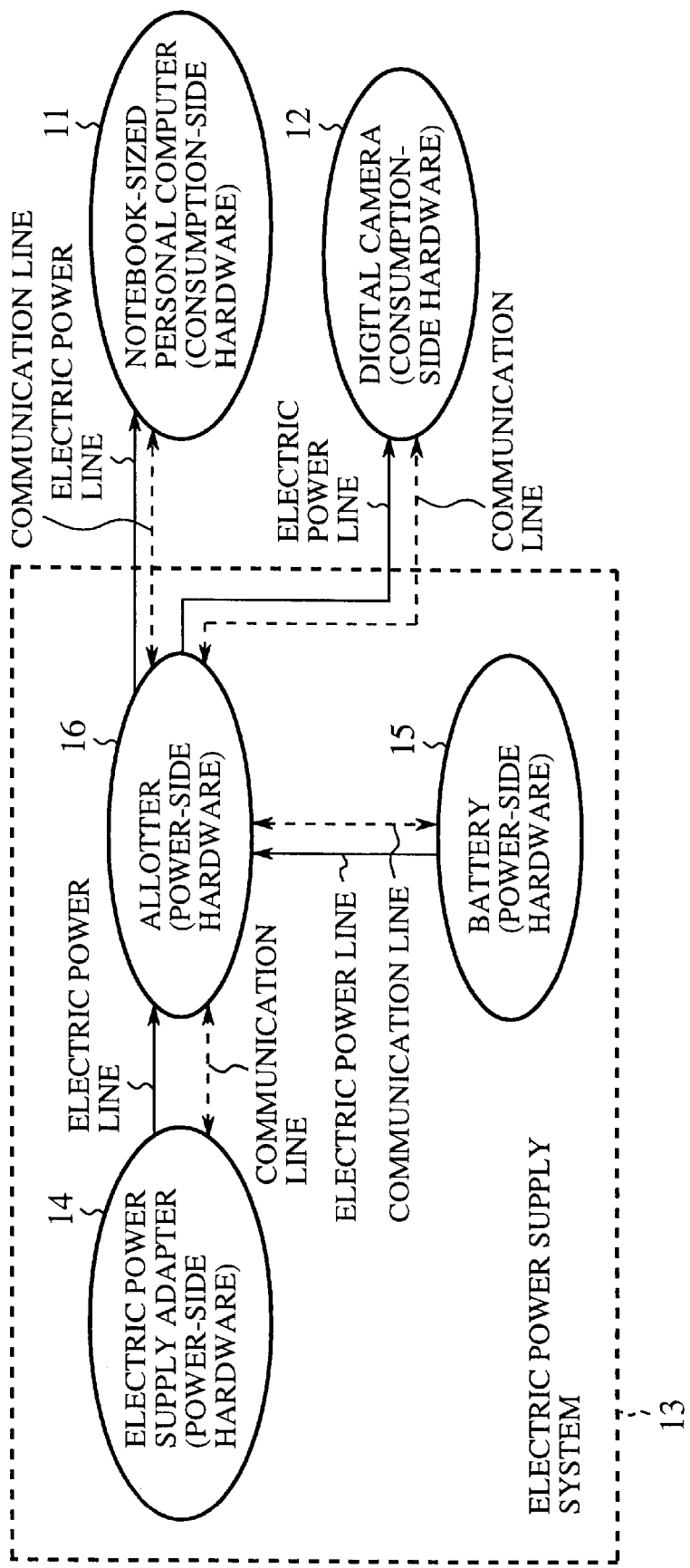
FIG. 1 is a block diagram showing an electric power supply system according to a first embodiment of the present invention.

FIG. 1 is a block diagram showing the configuration of an electric power supply system according to a first embodiment of the present invention. In FIG. 1, 11 indicates a notebook-sized personal computer (hereinafter called a personal computer) of consumption-side hardware which has a communication function and receives an electric power. 12 indicates a digital camera of the consumption-side hardware which has a communication function and receives an electric power. 13 indicates an electric power supply system which is arranged on the outside of both the personal computer 11 and the digital camera 12 and is connected with each of the personal computer 11 and the digital camera 12 through an electric power line and a communication line. The electric power line and the communication line are formed of an electric cable. An electric power required in the personal computer 11 and an electric power required in the digital camera 12 are supplied from the electric power supply system 13.

Also, in the electric power supply system 13, 14 indicates an electric power supply adapter, having a communication function and an electric power adjusting function, for converting an electric power supplied from an electric power company into another electric power according to electric power data sent through a communication line and outputting the converted electric power to an electric power line. In the conversion of the electric power, as is well-known, for example, an alternating current (AC) is converted into a direct current (DC), DC is converted into AC, a voltage value is changed to another voltage value, a current value is changed to another current value, an electric power value is changed to another electric power value, and an AC frequency is changed to another AC frequency. 15 indicates a battery, additionally having a communication function, for storing electric power, outputting the electric power according to electric power data sent through a communication line and informing of internal statuses (for example, residual electric power) through the communication line. 16 indicates an allotter, having a communication function and an electric power adjusting function, for sending the electric power data to each of the electric power supply adapter 14 and the battery 15 through the communication line, receiving the electric power output from each of the electric power supply adapter 14 and the battery 15, converting the received electric powers into another electric power according to electric power data sent from the personal computer 11 and the digital camera 12 and allotting the converted electric power to the personal computer 11 and/or the digital camera 12. Each of the electric power supply adapter 14, the battery 15 and the allotter 16 functions as power-side hardware. The personal computer 11, the digital camera 12, the electric power supply adapter 14, the battery 15 and the allotter 16 are connected with each other through an electric cable (the communication line, through which the electric power data is transmitted, and the electric power line through which the electric power is transmitted).

Figure 2:
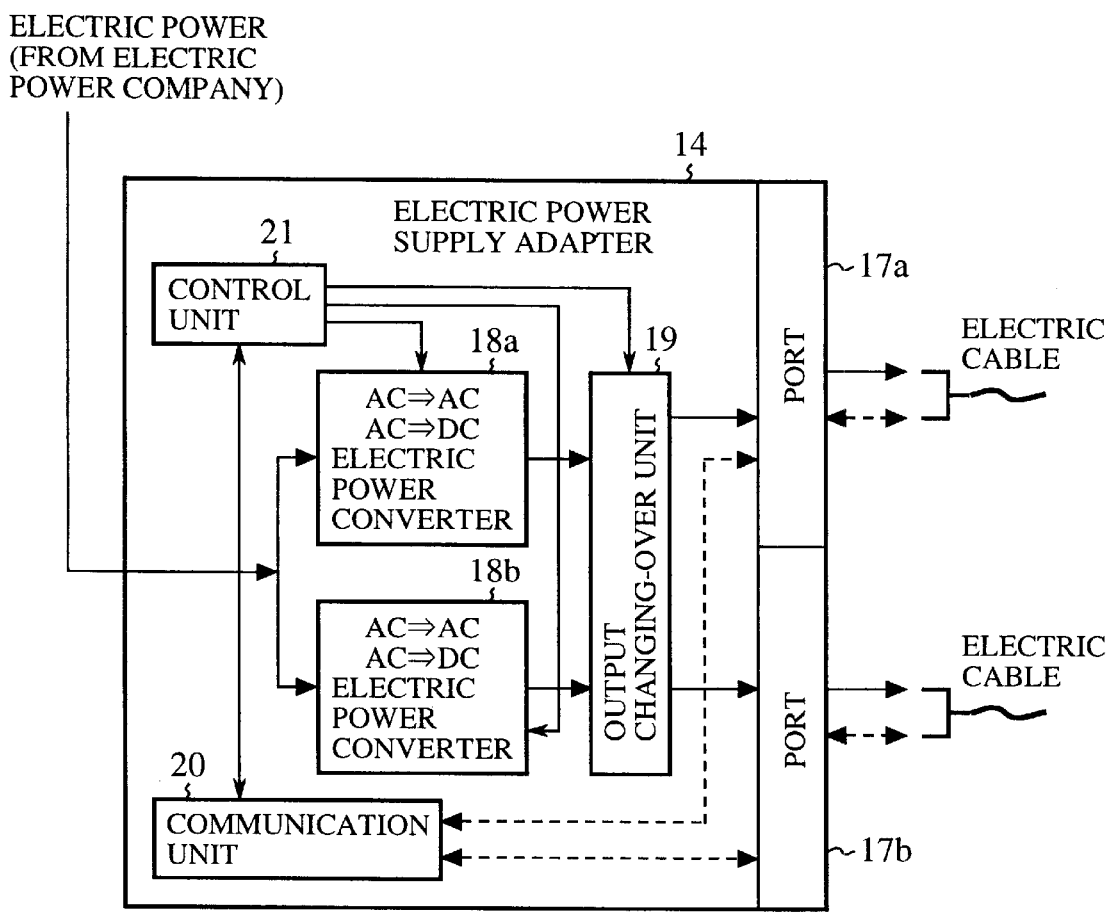
FIG. 2 is a block diagram showing the internal configuration of an electric power supply adapter shown in FIG. 1.

FIG. 2 is a block diagram showing the internal configuration of the electric power supply adapter 14. In FIG. 2, 17a indicates a port which is connected with the allotter 16 through one electric cable having both one electric power line and one communication line. 17b indicates a port which is connected with another allotter through one electric cable having both one electric power line and one communication line. 20 indicates a communication unit for receiving electric power data, which is sent from the allotter 16 or another allotter (the power-side hardware) to the port 17a or 17b through the communication line, and outputting electric power data, which indicates a maximum electric power possible to be currently output and internal statuses of the electric power supply adapter 14, to the allotter 16 or another allotter through the port 17a or 17b and the communication line. 18a and 18b respectively indicate an electric power converter for performing an AC-to-AC conversion or an AC-to-DC conversion for an AC electric power supplied from an electric power company according to the electric power data received in the communication unit 20. 19 indicates an output changing-over unit for changing over the selection of the converted electric power and the port from the electric power converted in the electric power converter 18b and the port 17b (or the electric power converted in the electric power converter 18a and the port 17a) to the electric power converted in the electric power converter 18a and the port 17a (or the electric power converted in the electric power converter 18b and the port 17b) and outputting the selected electric power to the communication line through the selected port 17a (or the port 17b). 21 indicates a control unit for controlling the electric power converters 18a and 18b and the output changing-over unit 19 according to the electric power data received in the communication unit 20.

In the electric power supply adapter 14 according to this embodiment, the AC electric power supplied from an electric power company is converted according to the electric power data and is output to the electric power line. However, it is applicable that a DC electric power supplied from a battery be converted. In this case, a DC-to-DC conversion or a DC-to-AC conversion is performed in each of the electric power converters 18a and 18b. Also, in this embodiment, there are two ports 17a and 17b. However, it is applicable that the number of ports be one, three or more. In case of one port, the output changing-over unit 19 is not required. In case of three or more ports, a plurality of electric power converters, of which the number equals to the number of ports, are required.

Figure 3:
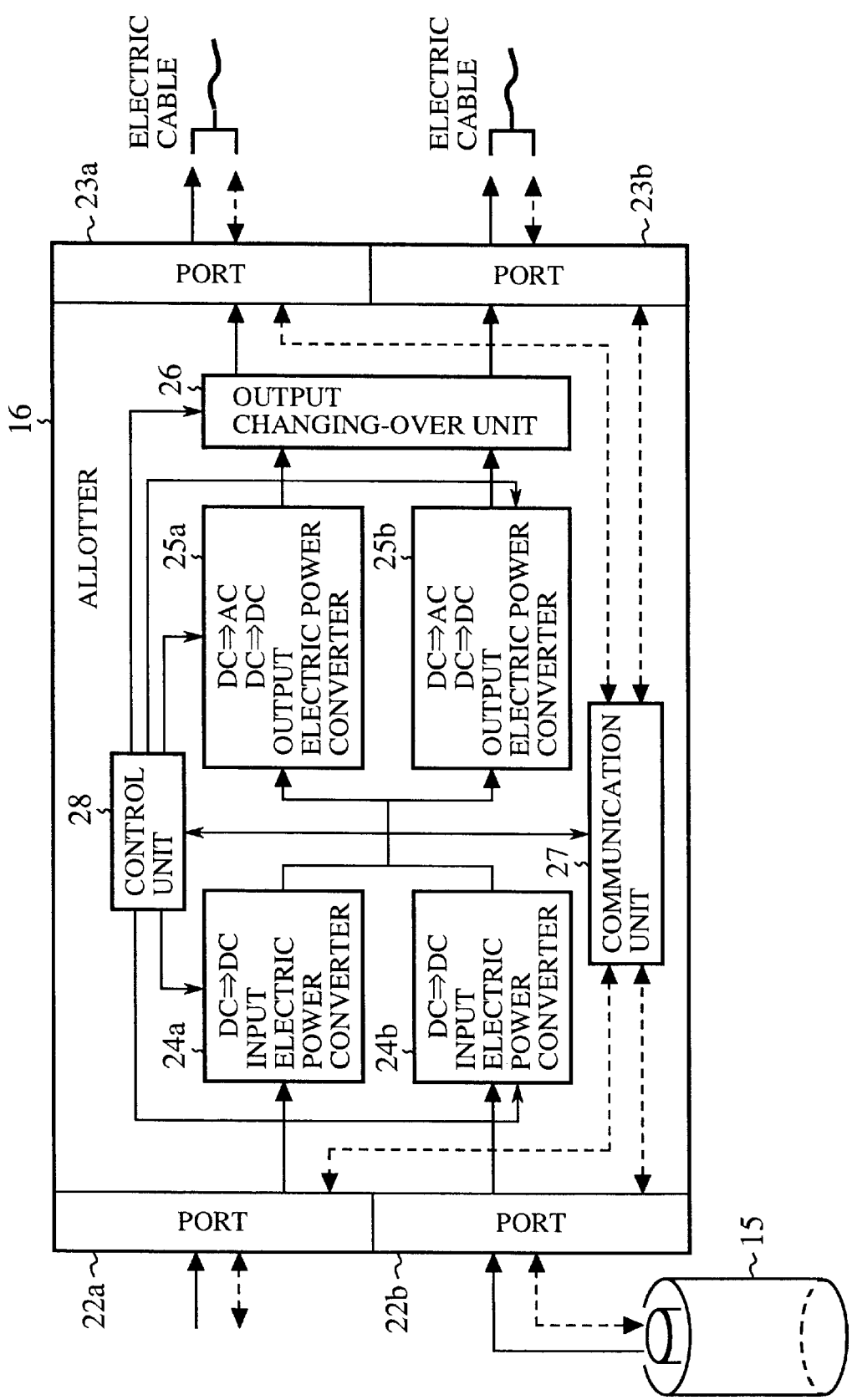
FIG. 3 is a block diagram showing the internal configuration of an allotter shown in FIG. 1.

FIG. 3 is a block diagram showing the internal configuration of the allotter 16. In FIG. 3, 22a and 22b respectively indicate a port which is arranged on the electric power input side and is connected with one electric cable having both one electric power line and one communication line. The port 22a is connected with the electric power supply adapter 14 (the power-side hardware) through the electric power line and the communication line, and the port 22b is connected with the battery 15 (the power-side hardware) through the electric power line and the communication line. 23a and 23b respectively indicate a port which is arranged on the electric power output side and is connected with one electric cable having both one electric power line and one communication line. The port 23a is connected with the personal computer 11 (the consumption-side hardware) through the electric power line and the communication line, and the port 23b is connected with the digital camera 12 (the consumption-side hardware) through the electric power line and the communication line.

27 indicates a communication unit for receiving the electric power data which is sent from the electric power supply adapter 14 or the battery 15 (the power-side hardware) to the port 22a or 22b through the communication line, receiving electric power data, which is sent from the personal computer 11 or the digital camera 12 (the consumption-side hardware) to the port 23a or 23b through the communication lin, and outputting electric power data, which indicates an electric power required in the allotter 16, to the electric power supply adapter 14 or the battery 15 (the power-side hardware) through the port 22a or 22b and the communication line. 24a and 24b indicate input electric power converters for respectively performing a DC-to-DC conversion for the input electric power received in the port 22a or 22b according to the electric power data received in the communication unit 27 and producing converted electric powers which are the same as each other. For example, voltages of the input electric powers received in the ports 22a and 22b differ from each other, and the voltage of the converted electric power obtained in the input electric power converter 24a is the same as that obtained in the input electric power converter 24b. 25a and 25b indicate output electric power converters for respectively performing a DC-to-AC conversion or a DC-to-DC conversion for the electric powers output from the input electric power converters 24a and 24b according to the electric power data received in the communication unit 27 to produce an output electric power. 26 indicates an output changing-over unit for changing over the selection of the output electric power and the port from the output electric power produced in the output electric power converter 25b and the port 23b (or the output electric power converter 25a and the port 23a) to the output electric power produced in the output electric power converter 25a and the port 23a (or the output electric power converter 25b and the port 23b) and outputting the selected output electric power to the electric power line through the selected port 23a (or 23b). 28 indicates a control unit for analyzing the electric power data received in the communication unit 27 and controlling the input electric power converters 24a and 24b, the output electric power converters 25a and 25b and the output changing-over unit 26 according to the electric power data.

In the allotter 16 according to this embodiment, the number of ports 22a and 22b arranged on the electric power input side is two. However, it is applicable that the number of ports arranged on the electric power input side be one, three or more.

Figure 4:
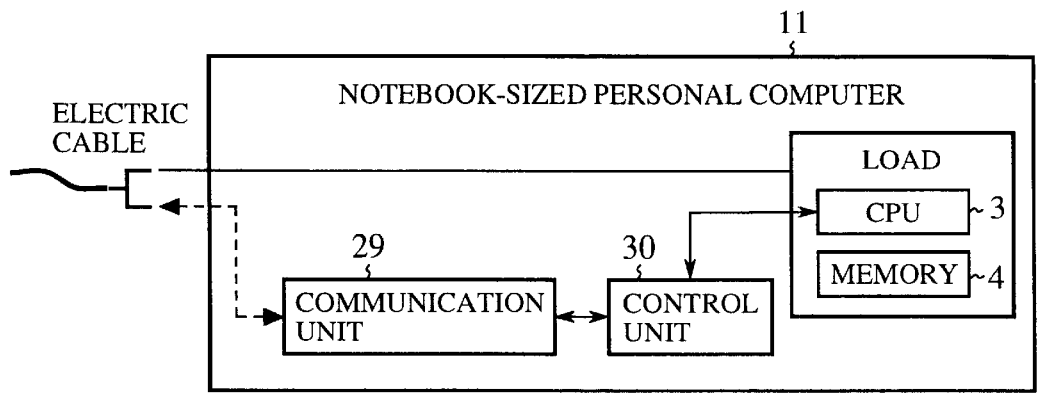
FIG. 4 is a block diagram showing the internal configuration of a notebook-sized personal computer representing consumption-side hardware shown in FIG. 1.

FIG. 4 is a block diagram showing the internal configuration of the notebook-sized personal computer 11 representing the consumption-side hardware. In FIG. 4, 3 indicates a CPU. 4 indicates a memory. 29 indicates a communication unit for receiving and transmitting electric power data from and to the allotter 16 of the electric power supply system 13 through the communication line. 30 indicates a control unit, connected with the CPU 3, for controlling the communication unit 29 and the CPU 3. Here, the CPU 3 and the memory 4 function as a load of the electric power transmitted through the electric power line.

Next, an operation of the electric power supply system 13 is described.

As shown in FIG. 4, the personal computer 11 has no smart battery system (SBS) composed of a system host, a smart battery, a smart charger and a smart selector. When the personal computer 11 is connected with the electric power supply system 13, electric power data, which indicates a consumption-side electric power (for example, AC or DC, a voltage value, a current value, a current frequency and an electric power value) suited to the personal computer 11, is transmitted from the communication unit 29 to the electric power supply system 13 through the communication line to require the consumption-side electric power of the electric power supply system 13. Here, there is a case where the personal computer 11 has a battery for the back-up purpose. Also, in cases where the personal computer 11 is used as a cordless apparatus, the personal computer 11 has a battery.

The electric power data sent from the personal computer 11 is transmitted to the allotter 16. In the allotter 16, the electric power data is received in the communication unit 27 through the port 23a arranged on the electric power output side and is transmitted to the control unit 28 to analyze the electric power data. Also, the communication unit 27 of the allotter 16 communicates with the electric power supply adapter 14 which is connected with the port 22a arranged on the electric power input side, and electric power data, which indicates an electric power required in the allotter 16, is transmitted to the electric power supply adapter 14 in this communication.

In the electric power supply adapter 14, the electric power data sent from the allotter 16 is received in the communication unit 20 through the port 17a and is analyzed in the control unit 21. The control unit 21 controls the electric power converters 18a and 18b according to the analysis result to convert an AC electric power received from the electric power company into an electric power matching with the electric power data sent from the allotter 16, and the converted electric powers are sent to the output changing-over unit 19. In the output changing-over unit 19, the electric power converted in the electric power converter 18a and the port 17a are selected according to the analysis result of the control unit 21, and the electric power matching with the electric power data sent from the allotter 16 is transmitted to the allotter 1.6 through the port 17a and the electric power line.

In addition to the transmission of the converted electric power, electric power data, which indicates a maximum electric power possible to be currently output from the electric power supply adapter 14 and internal statuses of the electric power supply adapter 14, is sent from the communication unit 20 to the allotter 16 through the port 17a and the communication line. Also, it is applicable that the electric power converter not used in the output changing-over unit 19 be used for one port. This function can be performed by changing the control performed in the control unit 21.

In the allotter 16, the input electric power transmitted from the electric power supply adapter 14 is received in the port 22a, and the DC-to-DC conversion is performed for the input electric power in the input electric power converter 24a to produce an electric power. Here, in cases where input electric powers different from each other are received in the ports 22a and 22b, the electric power conversion in the input electric power converter 24a is performed to convert the input electric power different from that received in the port 17b into an electric power which is the same as the input electric power received in the port 17b, and the converted electric power and the input electric power received in the port 17b are combined. For example, the input electric power having the DC voltage of 7 V is received in the port 22a, the input electric power having the DC voltage of 12 V is received in the port 22b, and the personal computer 11 requires the electric power having the DC voltage of 12 V. In this case, the DC voltage of the input electric power received in the port 22a is converted to the DC voltage of 12 V of an electric power in the input electric power converter 24a, and the converted electric power of 12 V is combined with the input electric power received in the port 22b. Therefore, in cases where input electric powers different from each other are not received in the ports 22a and 22b, each of the input electric power converters 24a and 24b is not operated. The converted electric power obtained in the input electric power converter 24a is input to the output electric power converters 25a and 25b, and the converted electric power is converted into an output electric power, which matches with the electric power data of the personal computer 11, under the control of the control unit 28, and the output electric powers obtained in the output electric power converters 25a and 25b are transmitted to the output changing-over unit 26. In the output changing-over unit 26, the output electric power obtained in the output electric power converter 25a and the port 23a are selected under the control of the control unit 28, and the output electric power matching with the electric power data of the personal computer 11 is transmitted to the personal computer 11 through the port 23a and the electric power line.

The difference in the electric power conversion between the allotter 16 and the electric power supply adapter 14 is as follows. In the electric power supply adapter 14, the electric power supplied from the electric power company is arbitrarily converted in the electric power converters 18a and 18b according to the electric power data of the allotter 16. In contrast, in the allotter 16, the electric powers transmitted from the electric power supply adapter 14 and the battery 15 are arbitrarily converted in the electric power converters 24a, 24b, 25a and 25b according to the electric power data of the personal computer 11.

Also, because the electric power transmitted from the electric power supply adapter 14 and the battery 15 respectively have an upper limit, one of the ports 23a and 23b is selected according to a pre-set priority order indicated from the control unit 28, and the allotment of the electric power to the personal computer 11 and the digital camera 12 is performed according to the pre-set priority order. This allotment is called a functional allotment. The functional allotment and intelligent functions in the allotter 16 are performed under the control of the control unit 28. Also, other functions can be performed in the allotter 16 by adding the other functions to the control unit 28.

Therefore, the electric power suited to the personal computer 11 is supplied from the electric power supply system 13 to the personal computer 11 through the electric power line, and the load such as the CPU 3 and the memory 4 is operated in the personal computer 11 by receiving the electric power. Also, in the same manner as in the personal computer 11, the digital camera 12 is operated by receiving the electric power from the electric power supply system 13.

In this embodiment, the personal computer 11 and the digital camera 12 represent the consumption-side hardware. However, it is applicable that other electronic apparatuses such as an audio home electronic apparatus be used as the consumption-side hardware. Also, the personal computer 11 and the digital camera 12 representing the consumption-side hardware are connected with the allotter 16 through the electric cables. However, it is applicable that the personal computer 11 and the digital camera 12 be directly connected with the ports 17a and 17b of the electric power supply adapter 14 through the electric cables. In this case, the electric power supply system 13 has only the electric power supply adapter 14.

Accordingly, following effects can be obtained in the first embodiment.

(1) It is not required to arrange a battery or a charger in the consumption-side hardware represented by the personal computer 11, the digital camera 12 and other electronic apparatuses. Therefore, the lightweight and small-sized consumption-side hardware can be obtained.

(2) Devices of the power-side hardware represented by the electric power supply adapter 14, the battery 15 and the allotter 16 can be selected regardless of types of electronic apparatuses representing the consumption-side hardware.

(3) Because the electric power data is transmitted among the devices of the power-side hardware and the electronic apparatuses of the consumption-side hardware through the communication lines, the electric power can be completely managed.

(4) Because the devices of the power-side hardware and the electronic apparatuses of the consumption-side hardware are connected with each other through the electric cables respectively having the electric power line and the communication line, no specific hardware is not required to connect the devices and the electronic apparatuses with each other.

(5) The electric power suited to each of all electronic apparatuses representing the consumption-side hardware can be supplied by using the electric power supply adapter 14. In other words, even though various electronic apparatuses having different rated electric powers are used as the consumption-side hardware, the electric power supply system can be widely used for the various electronic apparatuses.

(6) A plurality of input electric powers can be divided into a plurality of output electric powers in the allotter 16.

Embodiment 2

In the first embodiment, the electric power supply adapter 14, the allotter 16, the battery 15 and the personal computer 11 are connected with each other through the electric cables respectively having the electric power line and the communication line. However, in a second embodiment, the electric power supply adapter 14, the allotter 16, the battery 15 and the personal computer 11 are connected with each other through optical fiber cables (or optical cables), and an electric power wave carrying the electric power and a data wave carrying the electric power data are multiplexed with each other and are transmitted through each optical fiber cable.

Figure 5:
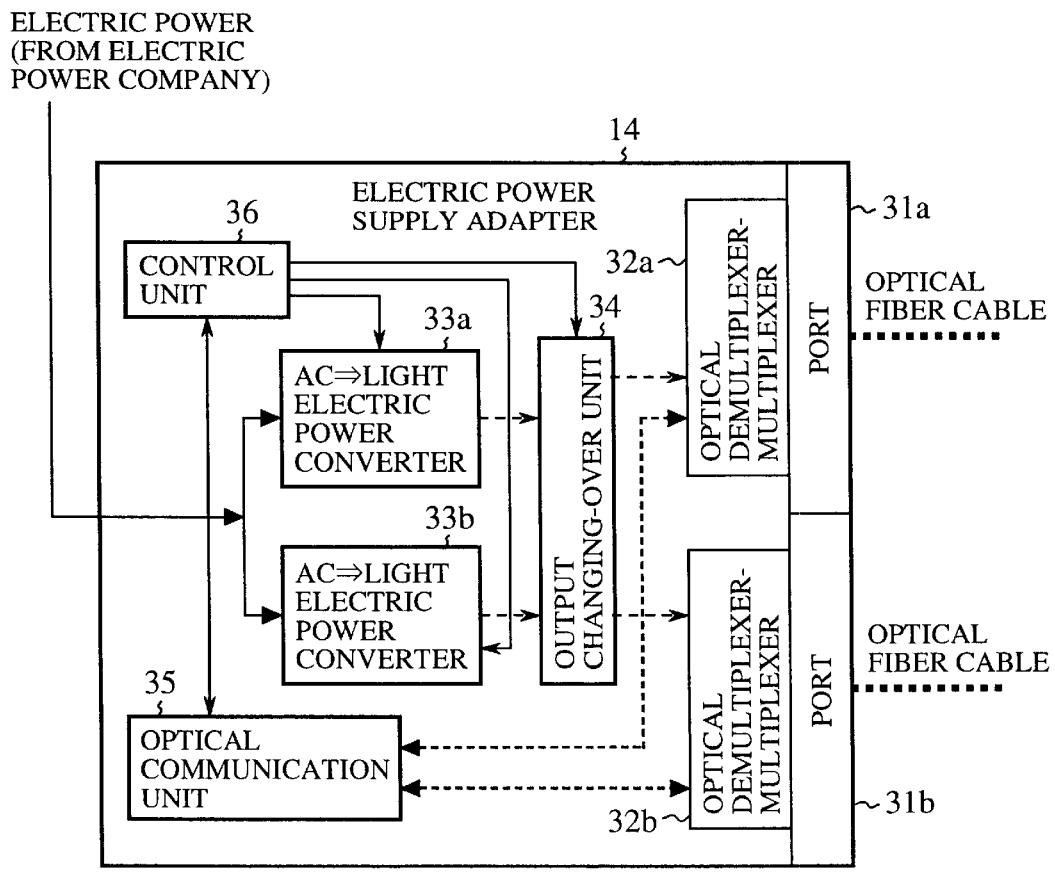
FIG. 5 is a block diagram showing the internal configuration of an electric power supply adapter arranged in the electric power supply system of FIG. 1 according to a second embodiment of the present invention.

FIG. 5 is a block diagram showing the internal configuration of the electric power supply adapter 14 arranged in an electric power supply system according to a second embodiment of the present invention. In FIG. 5, 31a and 31b respectively indicate a port connected with one optical fiber cable. An electric power wave and a data wave multiplexed with each other are transmitted through each optical fiber cable as a multiplexed wave. 32a indicates an optical demultiplexer-multiplexer for demultiplexing the multiplexed wave received in the port 31a to obtain the data wave denoting the electric power data sent from the allotter 16, multiplexing an electric power wave and a data wave with each other to produce a multiplexed data and outputting the multiplexed wave to the port 31a. 32b indicates an optical demultiplexer-multiplexer for demultiplexing the multiplexed wave received in the port 31b to obtain the data wave denoting the electric power data sent from another allotter, multiplexing an electric power wave and a data wave with each other to produce a multiplexed data and outputting the multiplexed wave to the port 31b. 35 indicates an optical communication unit for receiving the data wave denoting the electric power data demultiplexed in each of the optical demultiplexer-multiplexers 32a and 32b, converting the data wave into the electric power data and outputting a data wave of electric power data, which indicates a maximum electric power possible to be currently output and internal statuses of the electric power supply adapter 14, to the optical demultiplexer-multiplexers 32a and 32b. 33a and 33b respectively indicate an electric power converter for performing an AC-to-light conversion for an AC electric power supplied from an electric power company according to the electric power data received in the optical communication unit 35 to obtain an electric power wave. 34 indicates an output changing-over unit for changing over the selection of the electric power wave from the electric power wave obtained in the electric power converter 33b (or the electric power wave obtained in the electric power converter 33a) to the electric power wave obtained in the electric power converter 33a (or the electric power wave obtained in the electric power converter 33b) and outputting the selected electric power wave to the optical fiber cable through the optical demultiplexer-multiplexer 32a or 32b and the port 31a or 31b. 36 indicates a control unit for controlling the electric power converters 33a and 33b and the output changing-over unit 34 according to the electric power data obtained in the optical communication unit 35.

Figure 6:
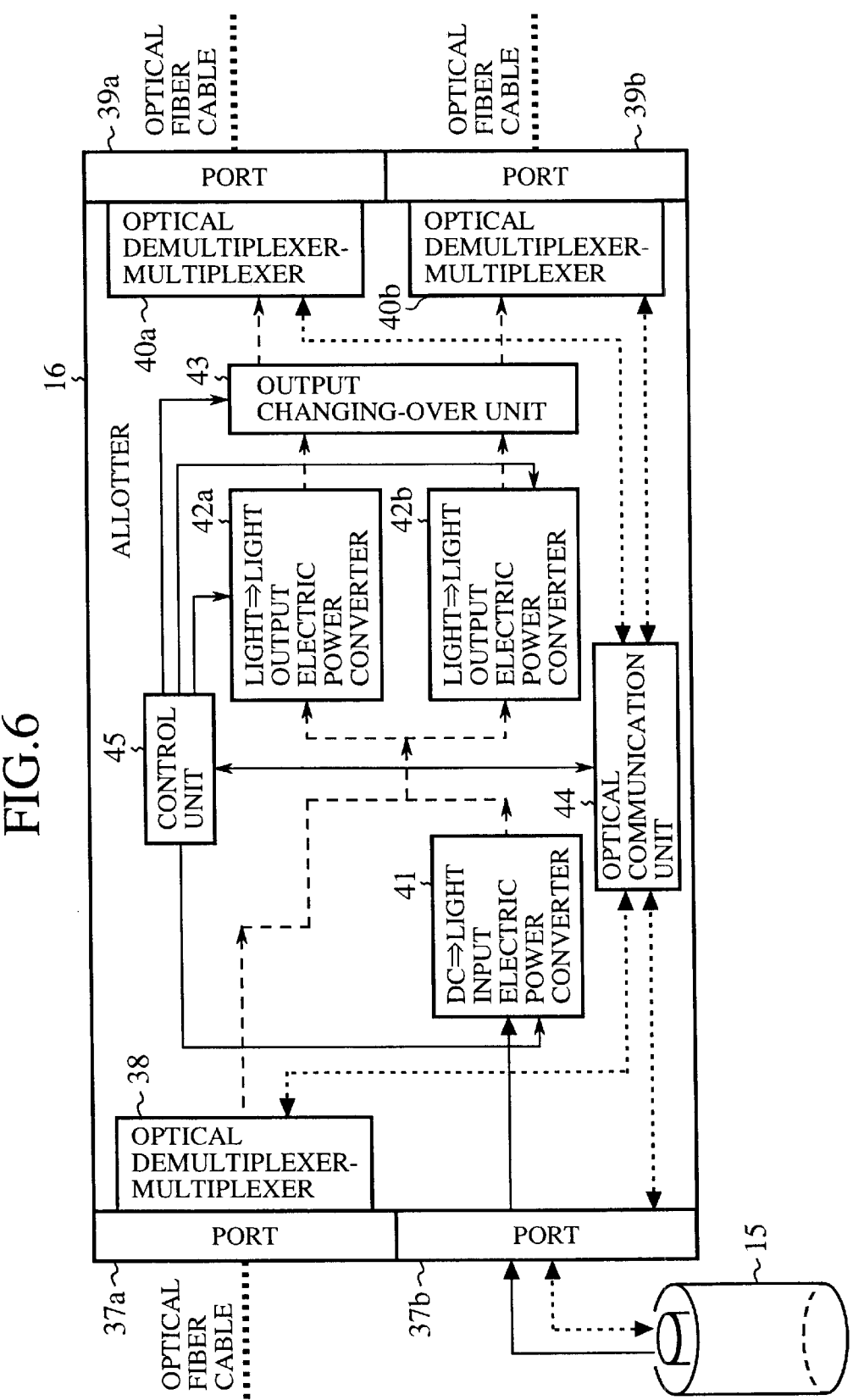
FIG. 6 is a block diagram showing the internal configuration of an allotter arranged in the electric power supply system of FIG. 1 according to the second embodiment of the present invention.

FIG. 6 is a block diagram showing the internal configuration of the allotter 16 arranged in the electric power supply system according to the second embodiment of the present invention. In FIG. 6, 37a indicates a port which is arranged on the electric power input side and is connected with the electric power supply adapter 14 though one optical fiber cable. 37b indicates a port which is arranged on the electric power input side and is connected with the battery 15 though one electric power line and one communication line. 38 indicates an optical demultiplexer-multiplexer for demultiplexing a multiplexed wave received in the port 37a to obtain both a data wave denoting electric power data and the electric power wave sent from the electric power supply adapter 14 and multiplexing a data wave indicating electric power data of the allotter 16 with the electric power wave. 39a indicates a port which is arranged on the electric power output side and is connected with the personal computer 11 (the consumption-side hardware) through one optical fiber cable. 39b indicates a port which is arranged on the electric power output side and is connected with the digital camera 12 (the consumption-side hardware) through. one optical fiber cable. 40a indicates an optical demultiplexer-multiplexer for demultiplexing a multiplexed wave received in the port 39a to obtain a data wave denoting electric power data sent from the personal computer 11 and multiplexing a data wave indicating electric power data of the allotter 16 with an electric power wave to output a multiplexed wave to the personal computer 11 through the port 39a and the optical fiber cable. 40b indicates an optical demultiplexer-multiplexer for demultiplexing a multiplexed wave received in the port 39b to obtain a data wave denoting electric power data sent from the digital camera 12 and multiplexing a data wave indicating electric power data of the allotter 16 with an electric power wave to output a multiplexed wave to the digital camera 12 through the port 39b and the optical fiber cable.

44 indicates an optical communication unit for receiving the data wave denoting the electric power data sent from each of the optical demultiplexer-multiplexers 38, 40a and 40b, converting the data wave into the electric power data, outputting a data wave denoting electric power data, which indicates an electric power required in the allotter 16, to the optical demultiplexer-multiplexer 38 and outputting a data wave denoting electric power data to the optical demultiplexer-multiplexers 40a and 40b. 41 indicates an input electric power converter for performing a DC-to-light conversion for the electric power of the battery 15 received in the port 37b into an electric power wave. 42a and 42b respectively indicate an input electric power converter for performing a light-to-light conversion for the electric power waves obtained in the optical demultiplexer-multiplexer 38 and the input electric power converter 41 according to the electric power data received in the optical demultiplexer-multiplexer 40a or 40b and producing an output electric power wave. 43 indicates an output changing-over unit for changing over the selection of the output electric power wave from the output electric power wave produced in the output electric power converter 42b (or the output electric power converter 42a) to the output electric power wave produced in the output electric power converter 42a (or the output electric power converter 42b) and outputting the selected output electric power wave to the optical fiber cable through the selected optical demultiplexer-multiplexer 40a or 40b and the selected port 39a or 39b. 45 indicates a control unit for controlling the input electric power converter 41, the output electric power converters 42a and 42b and the output changing-over unit 43 according to the electric power data obtained in the communication unit 44.

Figure 7:
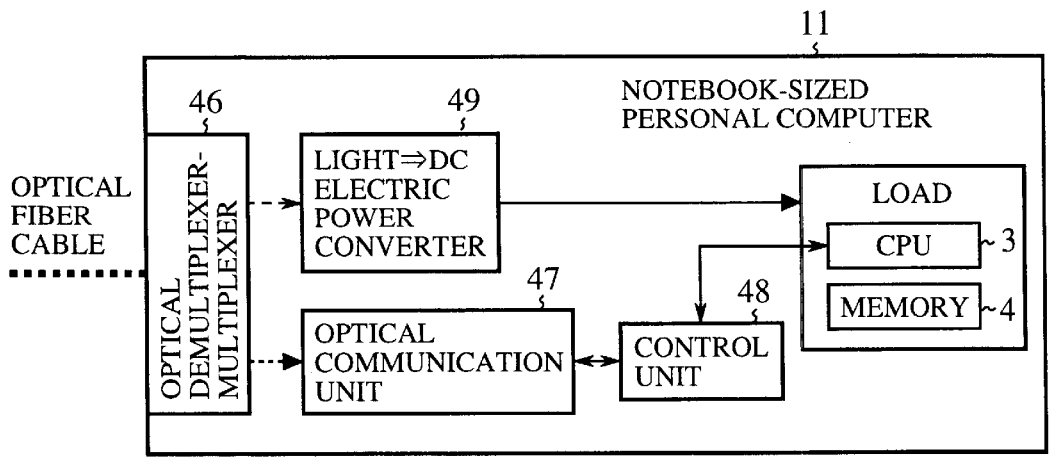
FIG. 7 is a block diagram showing the internal configuration of a notebook-sized personal computer representing the consumption-side hardware shown in FIG. 1 according to the second embodiment of the present invention.

FIG. 7 is a block diagram showing the internal configuration of the notebook-sized personal computer 11 representing the consumption-side hardware according to the second embodiment of the present invention. In FIG. 7, 3 indicates the CPU, and 4 indicates the memory. 46 indicates an optical demultiplexer-multiplexer for demultiplexing a multiplexed wave transmitting through the optical fiber cable to an electric power wave and a data wave and multiplexing a data wave, which indicates electric power data of the personal computer 11, with the multiplexed wave transmitting through the optical fiber cable. 47 indicates an optical communication-unit for receiving the data wave obtained in the optical demultiplexer-multiplexer 46 and outputting the electric power data of the personal computer 11 to the optical fiber cable through the optical demultiplexer-multiplexer 46. 48 indicates a control unit, connected with the CPU 3, for controlling the optical communication unit 47. 49 indicates an electric power converter for performing a light-to-DC conversion for the electric power wave obtained in the optical demultiplexer-multiplexer 46 to produce a DC electric power and supplying the DC electric power to the load composed of the CPU 3 and the memory 4.

Next, an operation of the electric power supply system 13 is described. Because a basic operation in the second embodiment is the same as that in the first embodiment, an operation different from that in the first embodiment is described.

When the personal computer 11 is connected with the electric power supply system 13 through the optical fiber cable, a data wave of electric power data, which indicates a consumption-side electric power suited to the personal computer 11, is transmitted from the optical communication unit 47 to the optical demultiplexer-multiplexer 46, and the data wave is multiplexed with a multiplexed wave transmitting through the optical fiber cable in the optical demultiplexer-multiplexer 46. Thereafter, the data wave is sent to the allotter 16 of the electric power supply system 13 through the optical fiber cable to request an electric power supply of the electric power supply system 13. In the allotter 16, the data wave of the electric power data indicating the consumption-side electric power suited to the personal computer 11 is demultiplexed from the multiplext wave of the optical fiber cable in the optical demultiplexer-multiplexer 40a and is received in the optical communication unit 44. Thereafter, the data wave of the electric power data indicating the consumption-side electric power is analyzed in the control unit 45. Also, a data wave of electric power data, which indicates an electric power required in the allotter 16 is produced in the optical communication unit 44 according to the analysis result and is multiplexed in the optical demultiplexer-multiplexer 38 with a multiplexed wave of an optical fiber cable connecting the allotter 16 and the electric power supply adapter 14, and the data wave of the electric power data indicating the electric power required in the allotter 16 is sent to the electric power supply adapter 14 through the port 37a and the optical fiber cable.

In the electric power supply adapter 14, the data wave sent from the allotter 16 is demultiplexed from the multiplexed wave of the optical fiber cable in the optical demultiplexer-multiplexer 32a and is received in the optical communication unit 35. Thereafter, the data wave is analyzed in the control unit 36. The control unit 36 controls the electric power converters 33a and 33b according to the analysis result to convert an AC electric power supplied from an electric power company into an electric power wave of an electric power matching with the electric power data received from the allotter 16, and the electric power waves obtained in the electric power converters 33a and 33b are sent to the output changing-over unit 34. In the output changing-over unit 34, the converted electric power wave obtained in the electric power converter 33a is selected according to the analysis result, and the electric power wave is multiplexed in the optical demultiplexer-multiplexer 32a with a data wave of electric power data of the electric power supply adapter 14. Thereafter, the electric power wave matching with the electric power data of the allotter 16 is transmitted from the port 31a to the allotter 16 through the optical fiber cable.

In the allotter 16, the electric power wave transmitted from the electric power supply adapter 14 is demultiplexed in the optical demultiplexer-multiplexer 38 from the multiplexed wave of the optical fiber cable and is input to the output electric power converters 42a and 42b. In the output electric power converter 42a, a light-to-light conversion is performed for the electric power wave under the control of the control unit 45 to convert the electric. power wave into another electric power wave of an electric power matching with the electric power data of the personal computer 11, and the electric power wave matching with the electric power data of the personal computer 11 is sent to the output changing-over unit 43. Also, a light-to-light conversion is performed for the electric power wave in the output electric power converter 42b under the control of the control unit 45, and another electric power wave is sent to the output changing-over unit 43. In the output changing-over unit 43, the electric power wave matching with the electric power data of the personal computer 11 is selected under the control of the control unit 45, and the selected electric power wave is multiplexed with a data wave sent from the optical communication unit 44 in the optical demultiplexer-multiplexer 40a. Thereafter, the electric power wave matching with the electric power data of the personal computer 11 is transmitted to the personal computer 11 through the port 39a and the optical fiber cable. In the personal computer 11, the electric power wave transmitted from the allotter 16 is demultiplexed from the multiplexed wave in the optical demultiplexer-multiplexer 46, and a light-to-DC conversion is performed for the electric power wave in the electric power converter 49 to produce a DC electric power matching with the electric power data of the personal computer 11. Thereafter, the DC electric power is supplied to the load composed of the CPU 3 and the memory 4.

Accordingly, in the second embodiment, because the personal computer 11, the allotter 16 and the electric power supply adapter 14 are connected with each other through the optical fiber cables, the electric power data can be transmitted at high speed. Also, the adverse influence of noise based on electromagnetic induction is not received in the data transmission.

In the second embodiment, the electric power data and the electric power are converted into light. However, the present invention is not limited to visible light. That is, the electric power data and the electric power can be converted into any electromagnetic wave possible to transmit through the optical fiber cable.

Embodiment 3

Figure 8A:
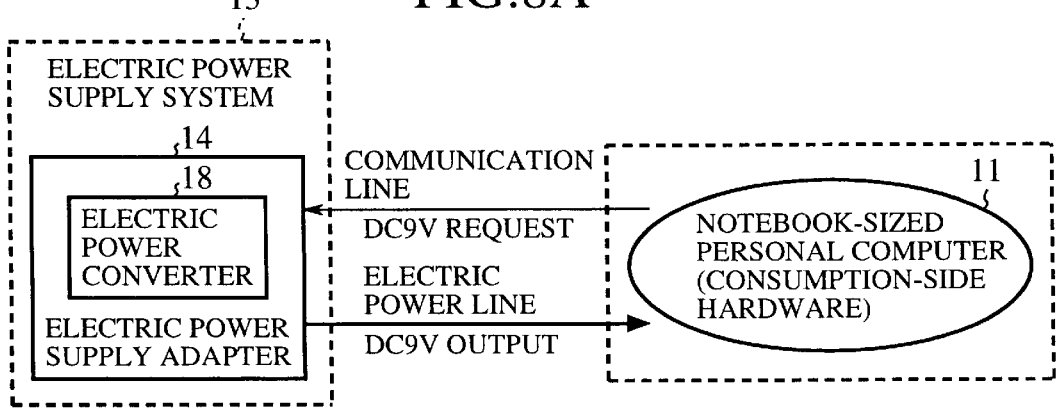
FIG. 8A is an explanatory view showing a direct-current (DC) electric power supply from the electric power supply adapter to a notebook-sized personal computer representing the consumption-side hardware according to a third embodiment of the present invention.
Figure 8B:
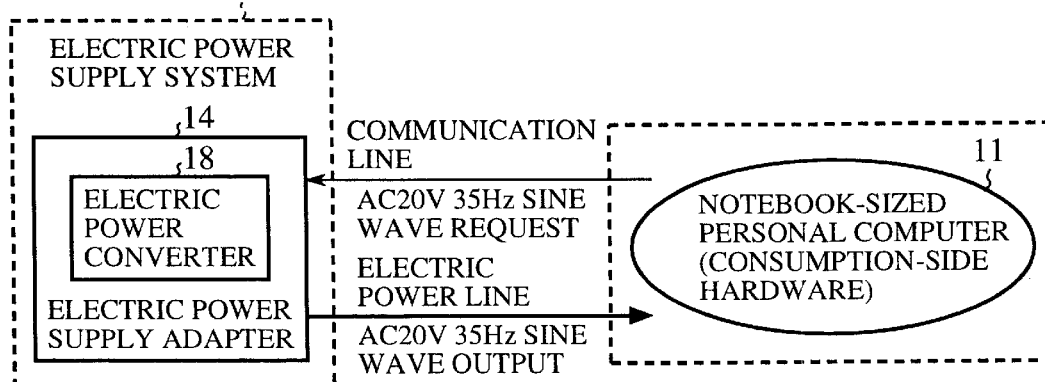
FIG. 8B is an explanatory view showing an alternating-current (AC) electric power supply from the electric power supply adapter to a notebook-sized personal computer representing the consumption-side hardware according to the third embodiment of the present invention.

FIG. 8A is an explanatory view,showing a direct-current (DC) electric power supply from the electric power supply adapter 14 to the personal computer 11 representing the consumption-side hardware according to a third embodiment of the present invention, and FIG. 8B is an explanatory view showing an alternating-current (AC) electric power supply from the electric power supply adapter 14 to the personal computer 11 representing the consumption-side hardware according to the third embodiment of the present invention. In FIG. 8A and FIG. 8B, 11 indicates the personal computer representing the consumption-side hardware, and 14 indicates the electric power supply adapter for supplying an electric power, which is required of the personal computer 11, to the personal computer 11. 18 indicates an electric power converter for converting an electric power, which is supplied from the outside to the electric power supply adapter 14, into another electric power required of the personal computer 11. An AC-to-DC converter or a DC-to-DC converter is used as the electric power converter 18 in the electric power supply of FIG. 8A, and an AC-to-AC converter or a DC-to-AC converter is used as the electric power converter 18 in the electric power supply of FIG. 8B.

An operation in the electric power supply is described.

The personal computer 11 communicates with the electric power supply adapter 14 through a communication line, and electric power data (for example, voltage data and current data) indicating an electric power suited to the personal computer 11 is sent from the personal computer 11 to the electric power supply adapter 14.

In an example shown in FIG. 8A, the personal computer 11 requires a DC electric power having 9 V of the electric power supply system 13 by sending the electric power data to the electric power supply adapter 14. Therefore, in cases where an AC electric power is supplied from the outside (or the electric power company) to the electric power supply adapter 14, the AC electric power is converted into a DC electric power having the voltage of 9 V by using an AC-to-DC converter of the electric power converter 18. Also, in cases where a DC electric power is supplied from the outside to the electric power supply adapter 14, the DC electric power is converted into a DC electric power having the voltage of 9 V by using a DC-to-DC converter of the electric power converter 18. Thereafter, the DC electric power having the voltage of 9 V is supplied to the personal computer 11 through the electric power line.

In an example shown in FIG. 8B, the personal computer 11 requires an AC electric power having 20 V and 35 Hz sine wave of the electric power supply system 13 by sending the electric power data to the electric power supply adapter 14. Therefore, in cases where an AC electric power is supplied from the outside to the electric power supply adapter 14, the AC electric power is converted into an AC electric power having the voltage of 20 V and a sine wave of 35 Hz by using an AC-to-AC converter of the electric power converter 18. Also, in cases where a DC electric power is supplied from the outside to the electric power supply adapter 14, the DC electric power is converted into an AC electric power having the voltage of 20 V and a sine wave of 35 Hz by using a DC-to-AC converter of the electric power converter 18. Thereafter, the AC electric power having the voltage of 20 V and a sine wave of 35 Hz is supplied to the personal computer 11 through the electric power line.

Accordingly, in the third embodiment, the electric power supply adapter 14 can be widely used for all types of electronic apparatuses having different rated electric powers. Therefore, it is not required to prepare one electric power supply adapter 14 for each type of electronic apparatus.

In the third embodiment, wire communication is performed between the personal computer 11 and the electric power supply adapter 14. However, it is applicable that radio communication be performed between the personal computer 11 and the electric power supply adapter 14. Also, this radio communication can be performed in following embodiments.

Embodiment 4

Figure 9:
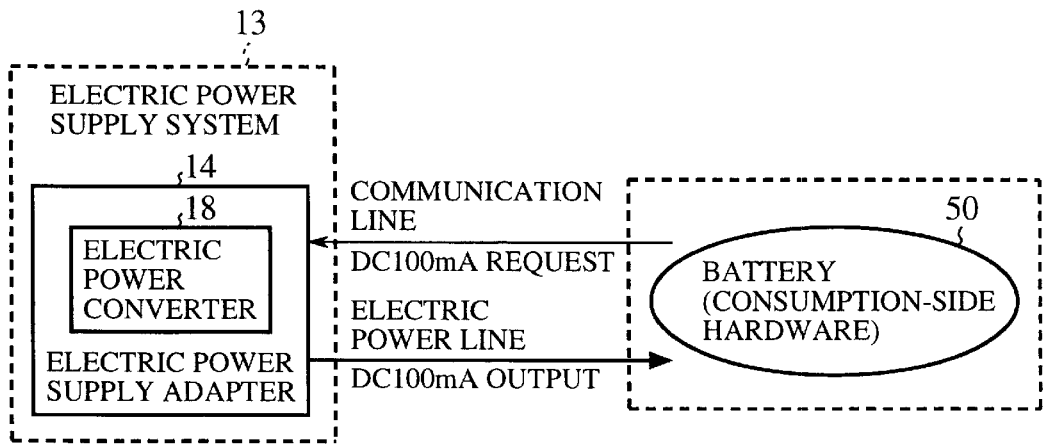
FIG. 9 is an explanatory view showing the charging of a battery according to a fourth embodiment of the present invention.

FIG. 9 is an explanatory view showing the charging of a battery according to a fourth embodiment of the present invention. In FIG. 9, 50 indicates a battery of the consumption-side hardware. The battery 50 has a communication function to send charging data of the battery 50, and the battery 50 is charged according to the charging data. 14 indicates the electric power supply adapter for supplying a charging electric power, which matches with the charging data sent from the battery 50, to the battery 50. 18 indicates the electric power converter for converting an electric power supplied from the outside into the charging electric power. An AC-to-DC converter or a DC-to-DC converter is used as the electric power converter 18.

An operation in the battery charging is described.

The battery 50 communicates with the electric power supply adapter 14 through a communication line by using the communication function of the battery 50, and charging data (for example, voltage data and current data) suited to the battery 50 is sent to the electric power supply adapter 14. As an example, the battery 50 requires a charging electric power having a direct current (DC) and 100 mA of the electric power supply system 13 by sending the charging data to the electric power supply adapter 14. In cases where an AC electric power is supplied from the outside to the electric power supply adapter 14, the AC electric power is converted into a DC electric power having the current of 100 mA by using an AC-to-DC converter of the electric power converter 18. Also, in cases where a DC electric power is supplied from the outside to the electric,power supply adapter 14, the DC electric power is converted into a DC electric power having the current of 100 mA by using a DC-to-DC converter of the electric power converter 18. Thereafter, the DC electric power having the current of 100 mA is supplied to the battery 50 through the electric power line. Therefore, the battery 50 receives the electric power suited to the charging of the battery 50 and is charged.

Accordingly, in the fourth embodiment, because the battery 50 has the communication function, the battery 50 can be charged by using the electric power supply adapter 14.

Therefore, in cases where each of various types batteries has the communication function, the electric power supply adapter 14 can be widely used for the various types batteries, and it is not required to prepare one electric power supply adapter 14 for each type of battery.

Embodiment 5

Figure 10:
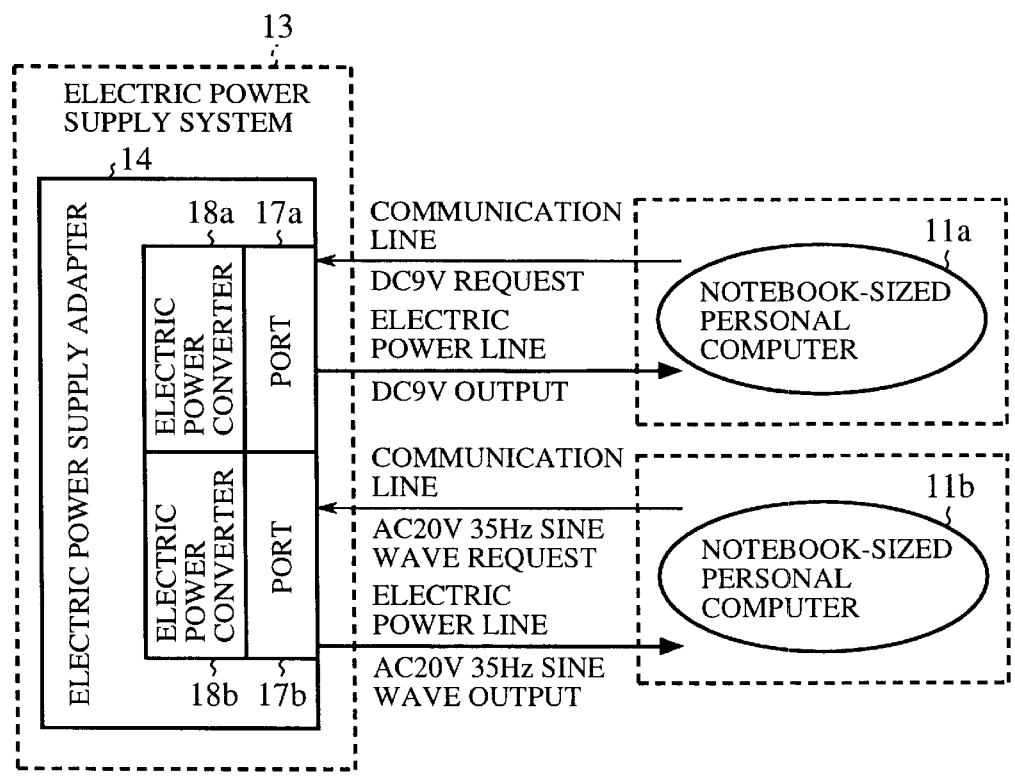
FIG. 10 is an explanatory view showing an electric power supply from the electric power supply adapter to a plurality of notebook-sized personal computers representing the consumption-side hardware according to a fifth embodiment of the present invention.
Figure 11A:
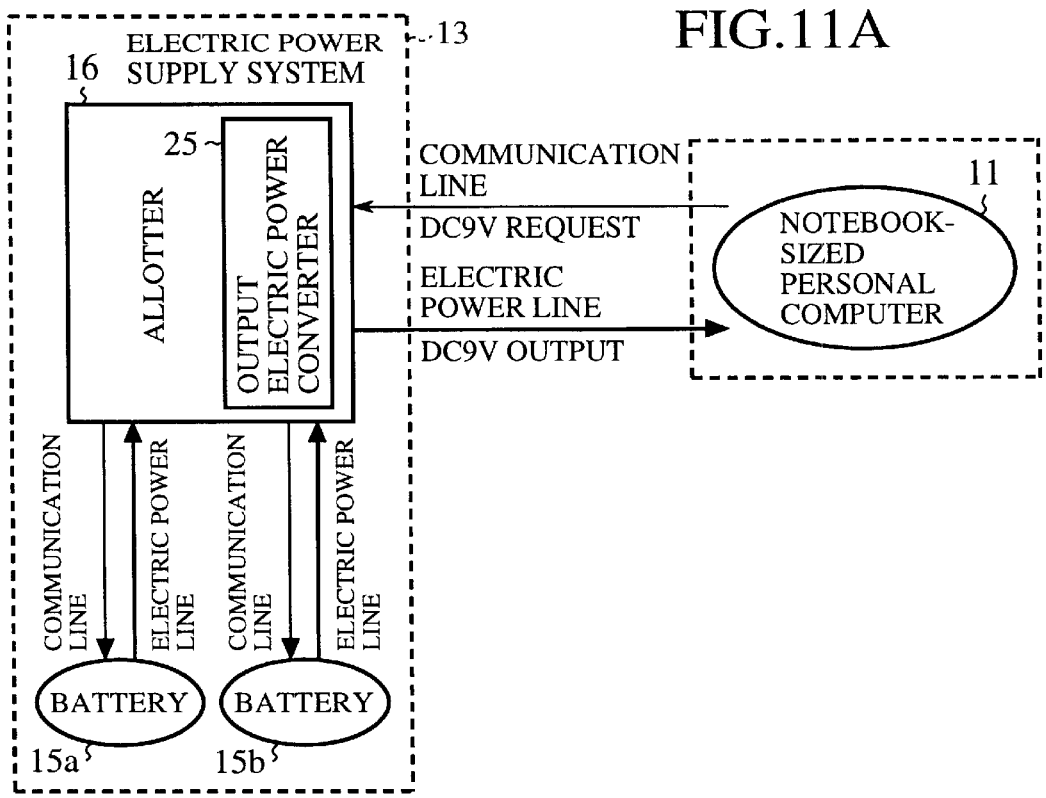
FIG. 11A is an explanatory view showing the supply of a DC electric power from a plurality of batteries to the personal computer of the consumption-side hardware according to a sixth embodiment of the present invention.
Figure 11B:
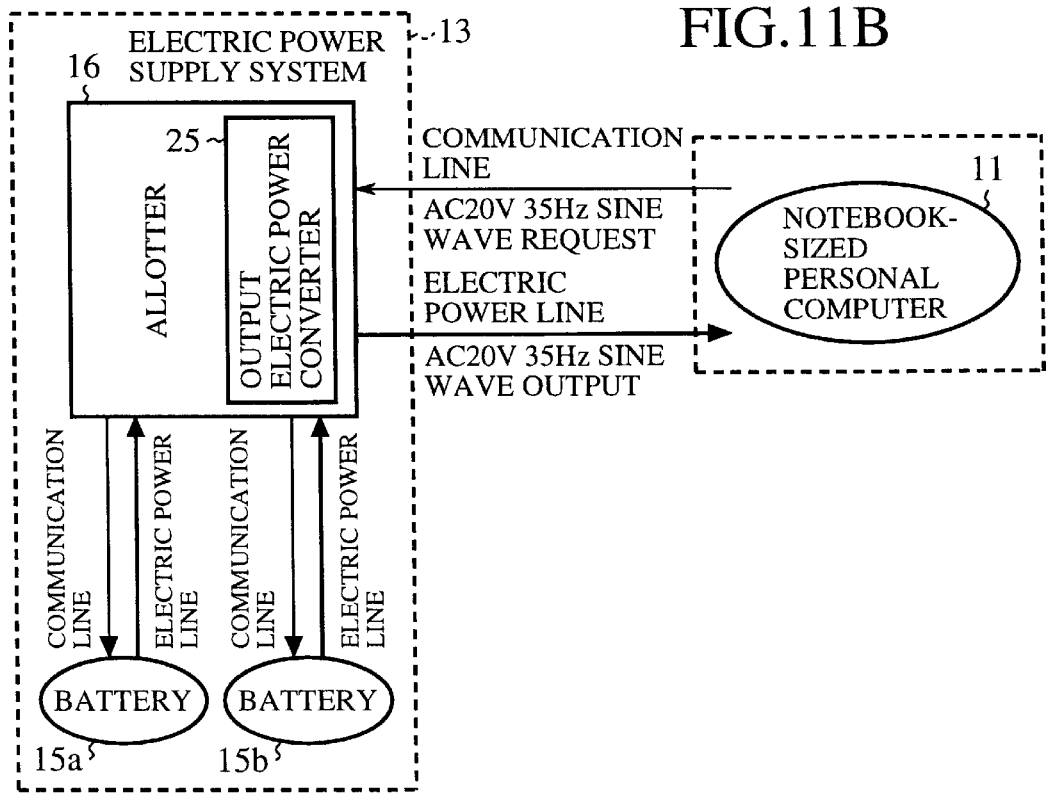
FIG. 11B is an explanatory view showing the supply of an AC electric power from a plurality of batteries to the personal computer of the consumption-side hardware according to the sixth embodiment of the present invention.

FIG. 10 is an explanatory view showing an electric power supply from the electric power supply adapter 14 to a plurality of personal computers representing the consumption-side hardware according to a fifth embodiment of the present invention. In FIGS. 10, 11a and 11b respectively indicate a notebook-sized personal computer, and 14 indicates the electric power supply adapter for supplying an electric power, which is required by each of the personal computers 11a and 11b, to the personal computer. Here, a type (for example, the number of outputs and a shape) of the electric power supply adapter 14 is selected by a user. In the example shown in FIG. 10, the number of outputs is two. 17a indicates a port connected with the personal computer 11a through an electric cable having both a communication line and an electric power line. 17b indicates a port connected with the personal computer 11b through an electric cable having both a communication line and an electric power line. 18a indicates an electric power converter for converting an electric power, which is supplied from the outside to the electric power supply adapter 14, into an electric power suited to the personal computer 11a according to electric power data which is sent from the personal computer 11a through the communication line. 18b indicates an electric power converter for converting an electric power, which is supplied from the outside to the electric power supply adapter 14, into an electric power suited to the personal computer 11b according to electric power data which is sent from the personal computer 11b through the communication line. In this embodiment, an AC-to-DC converter or a DC-to-DC converter is used as the electric power converter 18a, and an AC-to-AC converter or a DC-to-AC converter is used as the electric power converter 18b.

Next, an operation in the electric power supply to t-he personal computers 11a and 11b is described.

The electric power supply adapter 14 has two ports 17a and 17b, and each of the personal computers 11a and 11b communicates with the electric power supply adapter 14 through the communication line. That is, electric power data, which indicates a direct-current (DC) electric power suited to the personal computer 11a, is sent from the personal computer 11a to the electric power converter 18a through the communication line and the port 17a to request the DC electric power supply of the electric power supply system 13, and electric power data, which indicates an alternating-current (AC)-electric power suited to the personal computer 11b, is sent from the personal computer 11b to the electric power converter 18b through the communication line and the port 17b to request the AC electric power supply of the electric power supply system 13. In the example shown in FIG. 10, the personal computer 11a requests of the electric power converter 18a to supply the DC electric power having DC 9V to the personal computer 11a, and the personal computer 11b requests of the electric power converter 18b to supply the AC electric power having AC 20V and sine wave of 35 Hz to the personal computer 11b.

In the electric power supply adapter 14, in cases where an electric power supplied from the outside is the alternating current, the AC-to-DC converter of the electric power converter 18a and the AC-to-AC converter of the electric power converter 18b are used. In contrast, in cases where an electric power supplied from the outside is the direct current, the DC-to-DC converter of the electric power converter 18a and the DC-to-AC converter of the electric power converter 18b are used. Therefore, the electric power supplied from the outside is converted into the DC electric power having DC 9V in the electric power converter 18a, and the electric power supplied. from the outside is converted into the AC electric power having AC 20V and sine wave of 35 Hz in the electric power converter 18b. Thereafter, the DC electric power of DC 9V obtained in the electric power converter 18a is output to the personal computer 11a through the port 17a and the electric power line, and the AC electric power of AC 20V and 35 Hz sine wave obtained in the electric power converter 18b is output to the personal computer 11b through the port 17b and the electric power line. Therefore, each of the personal computers 11a and 11b can receive the electric power suited to the personal computer.

Accordingly, in the fifth embodiment, the electric power supply adapter 14 can be widely used for a plurality of electronic apparatuses of the consumption-side hardware represented by the personal computers 11a and 11b by connecting the personal computers 11a and 11b with the ports 17a and 17b of the electric power supply adapter 14. Therefore, the electric power supply adapter 14 can be used like a plug receptacle (100 V, 60 Hz) of a house.

Embodiment 6

FIG. 11A is an explanatory view showing the supply of a DC electric power from a plurality of batteries to the personal computer 11 of the consumption-side hardware according to a sixth embodiment of the present invention, and FIG. 11B is an explanatory view showing the supply of an AC electric power from a plurality of batteries to the personal computer 11 of the consumption-side hardware according to the sixth embodiment of the present invention.

In FIG. 11A and FIG. 11B, 11 indicates the personal computer representing the consumption-side hardware. 15a and 15b indicate two batteries of different types. 16 indicates the allotter for supplying an electric power, which is suited to the personal computer 11, to the personal computer 11 according to electronic power data sent from the personal computer 11. The allotter 16 has two ports (not shown) on its electric power input side and has a port (not shown) on its electric power output side. The personal computer 11 is connected with the port arranged on the electric power output side of the allotter 16 through a communication line and an electric power line. Each of the batteries 15a and 15b is connected with the port arranged on the electric power input side of the allotter 16 through a communication line and an electric power line. 25 indicates an output electric power converter for converting electric powers supplied from the batteries 15a and 15b into an electric power suited to the personal computer 11. A DC-to-DC converter is used as the output electric power converter 25 in the example of FIG. 11A, and a DC-to-AC converter is used as the output electric power converter 25 in the example of FIG. 11B.

Next, an operation in the electric power supply from the batteries 15a and 15b is described.

The allotter 16 communicates with each of the batteries 15a and 15b through the communication line. That is, the allotter 16 sends electric power data, which indicates an electric power required by the allotter 16, to the batteries 15a and 15b, and each of the batteries 15a and 15b sends electric power data, which indicates internal states (for example, residual electric power) of the battery as statuses, to the allotter 16. Thereafter, each of the batteries 15a and 15b outputs an electric power, which is set to a voltage possible in the battery, to the allotter 25 in response to the electric power data of the allotter 16. Here, in cases where each of the batteries 15a and 15b has no communication function, each of the batteries 15a and 15b outputs its electric power to the allotter 25.

Also, the personal computer 11 communicates with the allotter 16 through the communication line to send electric power data, which indicates an electric power suited to the personal computer 11, to the allotter 16. In the example of FIG. 11A, because the personal computer 11 requires of the electric power supply system 13 to supply a DC electric power of 9V to the personal computer 11, the allotter 16 simultaneously receives two electric powers. having different DC voltages from the batteries 15a and 15b through the electric power lines. The received electric powers are converted into the DC electric power of 9V in the DC-to-DC converter of the output electric power converter 25, and the DC electric power of 9V is supplied to the personal computer 11 through the electric power line. Also, in the example of FIG. 11B, because the personal computer 11 requires of the electric power supply system 13 to supply an AC electric power of 20V and 35 Hz sine wave to the personal computer 11, the allotter 16 simultaneously receives two electric powers having different DC voltages from the batteries 15a and 15b through the electric power lines. The received electric powers are converted into the AC electric power of 20V and 35 Hz sine wave in the DC-to-AC converter of the output electric power converter 25, and the AC electric power of 20V and 35 Hz sine wave is supplied to the personal computer 11 through the electric power line.

Accordingly, in the sixth embodiment, any types of batteries can be simultaneously used to supply an electric power, which is suited to the consumption-side hardware, to the consumption-side hardware.

Embodiment 7

Figure 12:
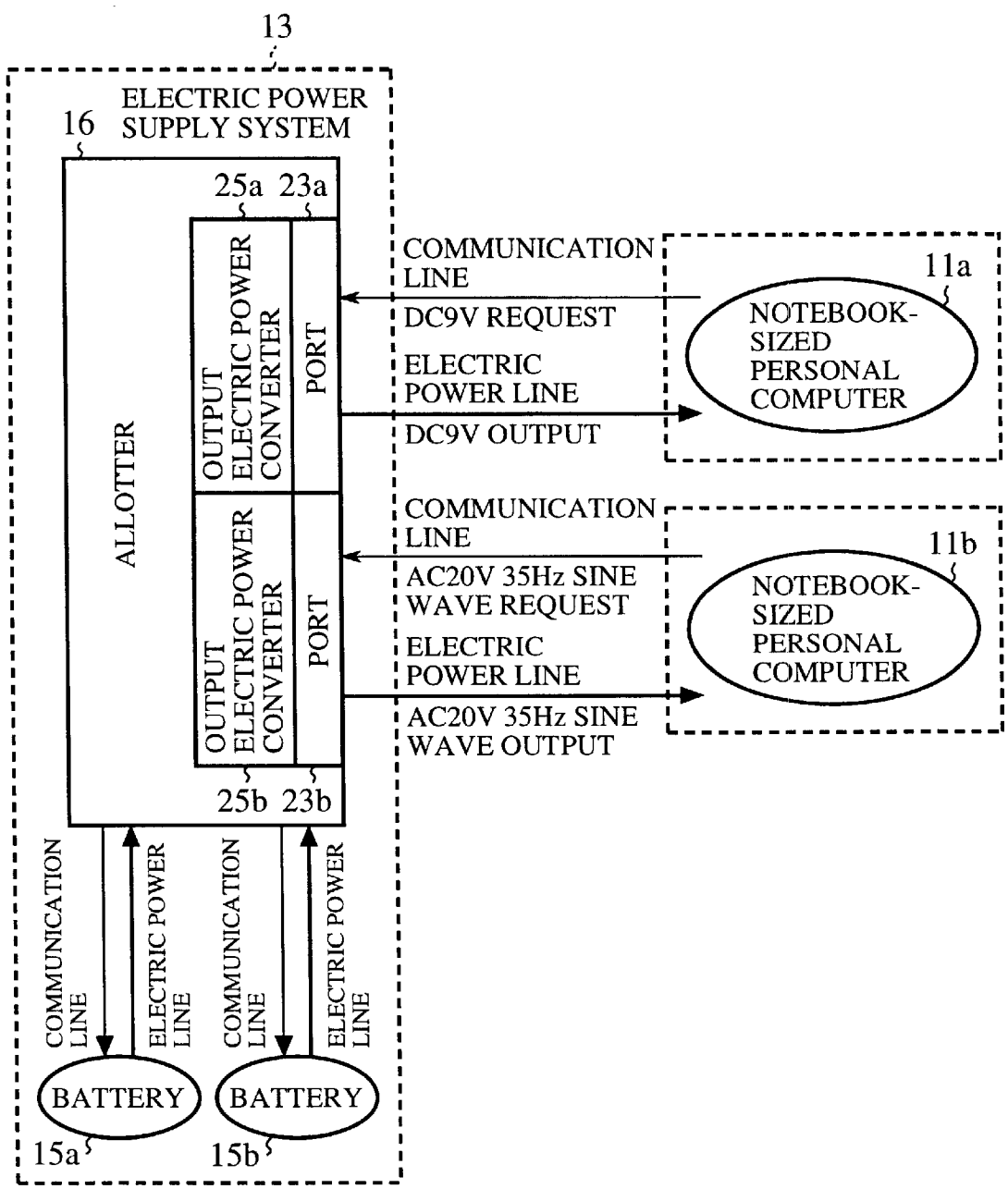
FIG. 12 is an explanatory view showing an electric power supply from a plurality of batteries to a plurality of notebook-sized personal computers representing the consumption-side hardware according to a seventh embodiment of the present invention.

FIG. 12 is an explanatory view showing an electric power supply from a plurality of batteries to a plurality of personal computers representing the consumption-side hardware according to a seventh embodiment of the present invention. In FIG. 12, 11a and 11b respectively indicate the personal computer. 15a and 15b indicate two batteries of different types. 16 indicates the allotter for supplying electric powers, which are suited to the personal computers 11a and 11b, to the personal computers 11a and 11b according to electronic power data sent from the personal computers 11a and 11b. The allotter 16 has two ports (not shown) placed on its electric power input side and two ports 23a and 23b placed on its electric power output side. Each of the personal computers 11a and 11b is connected with the port 23a or 23b arranged on the electric power output side of the allotter 16 through a communication line and an electric power line. Each of the batteries 15a and 15b is connected with the port arranged on the electric power input side of the allotter 16 through a communication line and an electric power line. 25a indicates the output electric power converter for converting electric powers supplied from the batteries 15a and 15b into an electric power suited to the personal computer 11a. 25b indicates the output electric power converter for converting the electric powers supplied from the batteries 15a and 15b into an electric power suited to the personal computer 11b. A DC-to-DC converter is used as the output electric power converter 25a, and a DC-to-AC converter is used as the output electric power converter 25b.

Next, an operation in the electric power supply is described.

The allotter 16 communicates with each of the batteries 15a and 15b through the communication line. That is, the allotter 16 sends electric power data, which indicates an electric power required by the allotter 16, to the batteries 15a and 15b, and each of the batteries 15a and 15b outputs an electric power, which is set to a voltage possible in the battery, to the allotter 25 in response to the electric power data of the allotter 16. Here, in cases where one of the batteries 15a and 15b has a communication function, the battery having the communication function sends electric power data, which indicates internal states (for example, residual electric power) of the battery as statuses, to the allotter 16. Also, in cases where each of the batteries 15a and 15b has no communication function, each of the batteries 15a and 15b outputs only its electric power to the allotter 25.

Also, the personal computer 11a communicates with the allotter 16 through the communication line and the port 23a to send electric power data, which indicates an electric power suited to the personal computer 11a, to the allotter 16, and the personal computer 11b communicates with the allotter 16 through the communication line and the port 23b to send electric power data, which indicates an electric power suited to the personal computer 11b, to the allotter 16.

In the example of FIG. 12, the personal computer 11a requires of the electric power supply system 13 to supply a DC electric power of 9V to the personal computer 11a, and the personal computer 11b requires of the electric power supply system 13 to supply an AC electric power of 20V and 35 Hz sine wave to the personal computer 11b. Therefore, the allotter 16 simultaneously receives two electric powers having different DC voltages from the batteries 15a and 15b through the electric power lines. The received electric powers are converted into the DC electric power of 9V in the DC-to-DC converter of the output electric power converter 25a, and the DC electric power of 9V is supplied to the personal computer 11a through the port 23a and the electric power line. Also, the received electric powers are converted into the AC electric power of 20V and 35 Hz sine wave in the DC-to-AC converter of the output electric power converter 25b, and the AC electric power of 20V and 35 Hz sine wave is supplied to the personal computer 11b through the port 23b and the electric power line. Therefore, each of the personal computers 11a and 11b can receive the electric power suited to the personal computer from the allotter 16.

Accordingly, in the seventh embodiment, electric. powers supplied from a plurality of batteries can be converted in the allotter 16 into an electric power suited to each of a plurality of personal computers representing the consumption-side hardware, and the converted electric power suited to each personal computer can be supplied to the personal computer.

Embodiment 8

Figure 13:
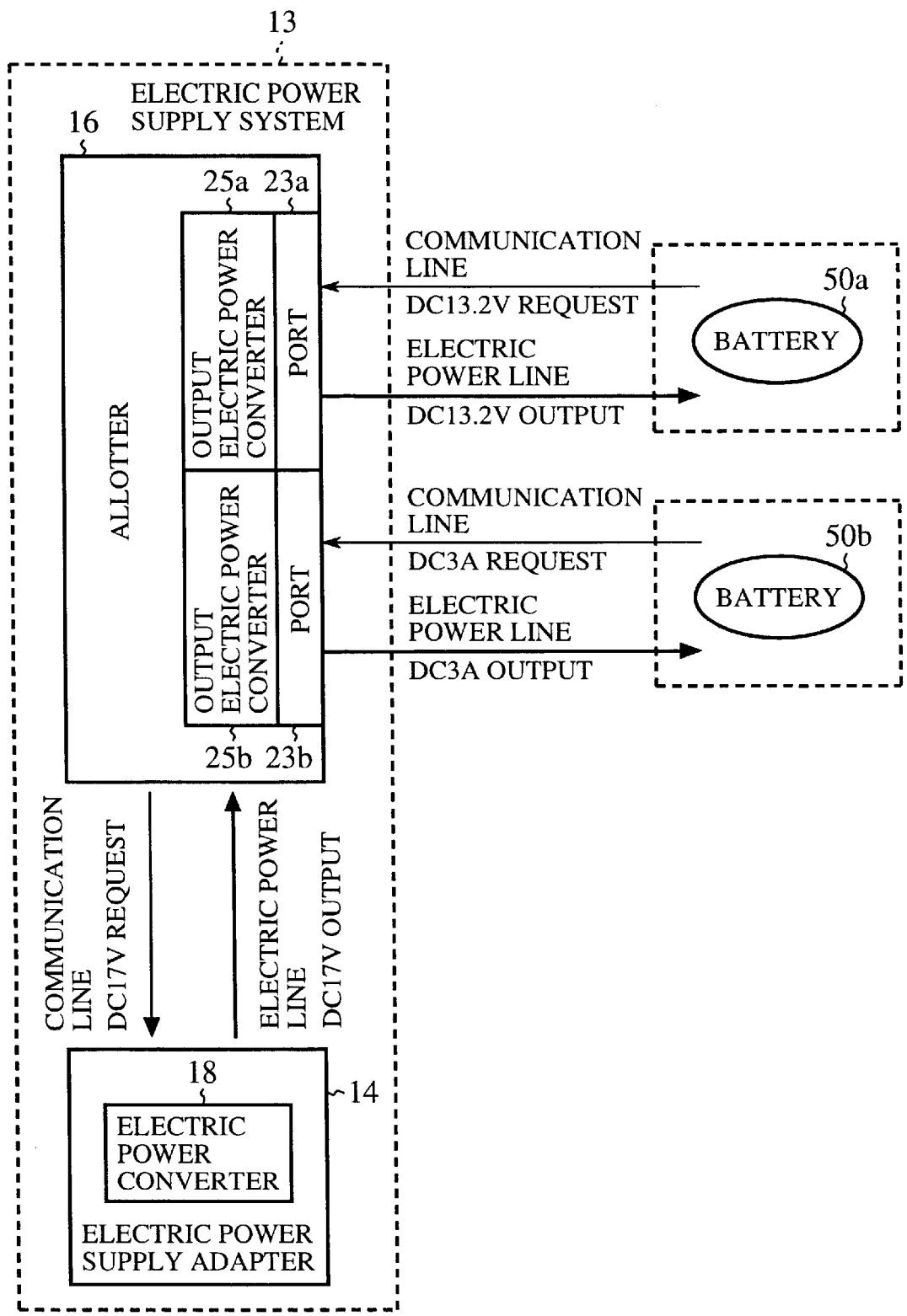
FIG. 13 is an explanatory view showing the battery charging according to an eighth embodiment of the present invention.

FIG. 13 is an explanatory view showing the battery charging according to an eighth embodiment-of the present invention. In FIG. 13, 50a and 50b respectively indicate a battery to which an electric power is given, and the batteries 50a and 50b represent the consumption-side hardware. Each of the batteries 50a and 50b has a communication function and sends charging data of the battery to the electric power supply system 13. 16 indicates the allotter for supplying a charging electric power, which is required in each of the batteries 50a and 50b, to the battery in response to the charging data sent from the battery. In the example of FIG. 13, the allotter 16 has two ports placed on the electric power output side and one port (not shown) placed on the electric power input side. 14 indicates the electric power supply adapter for supplying an electric power, which is required by the allotter 16, to the allotter 16. Here, a connection type of the electric power supply adapter 14 and a connection type of the allotter 16 are selected by a user.

Also, 18 indicates the electric power converter for converting an electric power supplied from the outside into an electric power appropriate to the allotter 16 according to electric power data of the allotter 16, and an AC-to-DC converter or a DC-to-DC converter is used as the electric power converter 18. 23a and 23b indicate the ports placed on the electric power output side of the allotter 16. The port 23a is connected with the battery 50a through a communication line and an electric power line, and the port 23b is connected with the battery 50b through a communication line and an electric power line. 25a indicates the output electric power converter for converting the electric power, which is supplied from the electric power supply adapter 14 to the allotter 16, into the charging electric power matching with the charging data sent from the battery 50a. 25b indicates the output electric power converter for converting the electric power, which is supplied from the electric power supply adapter 14 to the allotter 16, into the charging electric power matching with the charging data sent from the battery 50b. In the example of FIG. 13, a DC-to-DC converter is used as each of the output electric power converters 25a and 25b.

Next, an operation in the battery charging is described.

Each of the batteries 50a and 50b communicates with the allotter 16 through the communication line according to the communication function to send the charging data appropriate to the battery to the allotter 16. In the example of FIG. 13, the battery 50a requires the allotter 16 to supply a DC electric power of 13.2 V to the battery 50a, and the battery 50b requires the allotter 16 to supply a DC electric power of 3 A to the battery 50b. Thereafter, the allotter 16, in which the charging data is received, sends electric power data to the electric power supply adapter 14 to request a DC electric power having 17 V of the electric power supply adapter 14.

In the electric power supply adapter 14, in cases where an AC electric power is supplied from the outside, the AC electric power is converted into a DC electric power of 17 V by using the AC-to-DC converter of the electric power converter 18. Also, in cases where a DC electric power is supplied from the outside, the DC electric power is converted into a DC electric power of 17 V by using the DC-to-DC converter of the electric power converter 18. The DC electric power of 17 V is supplied to the allotter 16 through the electric power line.

In the allotter 16, the DC electric power of 17 V supplied from the electric power supply adapter 14 is converted into a charging electric power of DC 13.2 V by using the DC-to-DC converter of the output electric power converter 25a, and the charging electric power of DC 13.2 V is supplied to the battery 50a through the port 23a and the electric power line. Also, the DC electric power of 17 V supplied from the electric power supply adapter 14 is converted into a charging electric power of DC 3 A by using the DC-to-DC converter of the output electric power converter 25b, and the charging electric power of DC 3 A is supplied to the battery 50b through the port 23b and the electric power line. Therefore, each of the batteries 50a and 50b can receive the charging electric power appropriate to the battery and are charged.

Accordingly, in the eighth embodiment, various batteries, of which the appropriate charging electric powers differ from each other, can be charged by using the allotter 16 common to the batteries.

Embodiment 9

Figure 14:
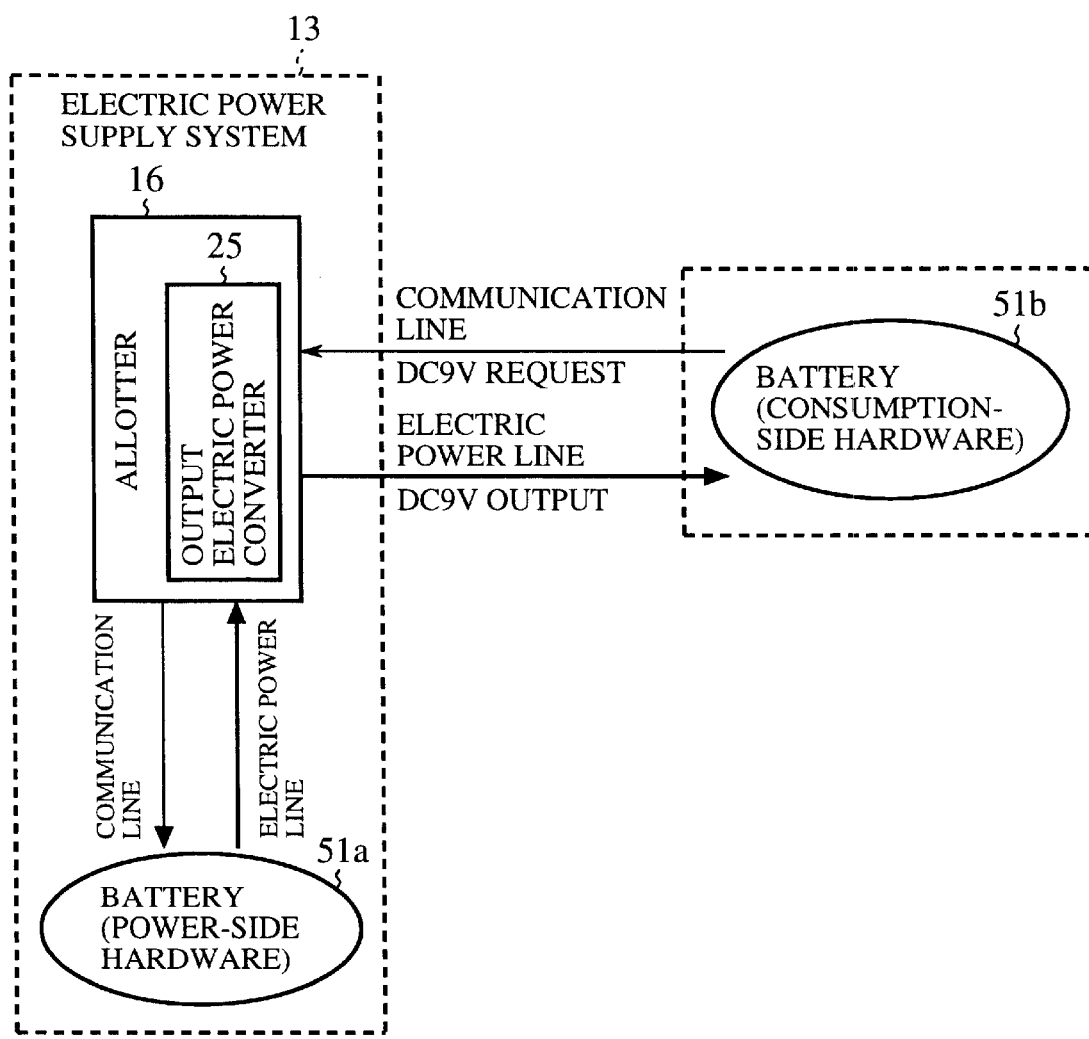
FIG. 14 is an explanatory view showing the transferring of an electric power, with which a battery is charged, to another battery according to a ninth embodiment of the present invention.

FIG. 14 is an explanatory view showing the transferring of an electric power, with which a battery is charged, to another battery according to a ninth embodiment of the present invention. In FIG. 14, 51a indicates a battery of the power-side hardware. 51b indicates a battery of the consumption-side hardware. The battery 51b has a communication function to output charging data of the battery 51b. 16 indicates the allotter for transferring an electric power, with which the battery 51a is charged, to the battery 51b. In the example of FIG. 14, the allotter 16 has one port (not shown) placed on the electric power output side and one port (not shown) placed on the electric power input side, the battery 51a is connected with the port placed on the electric power input side of the allotter 16 through a communication line and an electric powerline, and the battery 51b is connected with the port placed on the electric power output side of the allotter 16 through a communication line and an electric power line. 25 indicates the output electric power converter for converting an electric power, which is supplied from the battery 51a to the allotter 16, into a charging electric power matching with the charging data sent from the battery 51b. A DC-to-DC converter is, for example, used as the output electric power converter 25.

Next, an operation in the electric power transferring from the battery 51a to the battery 51b is described.

The battery 51b communicates with the allotter 16 through the communication line according to the communication function to send the charging data appropriate to the battery 51b to the allotter 16. In the example of FIG. 14, the battery 51b requests of the allotter 16 to supply a DC electric power of 9 V to the battery 51b. When the allotter 16 receives the charging data from the battery 51b, the allotter 16 receives an electric power from the battery 51a, and the electric power received from the battery 51a is converted into a charging electric power of DC 9 V by using the DC-to-DC converter of the output electric power converter 25, and the charging electric power of DC 9 V is supplied to the battery 51b through the electric power line. Therefore, the electric power, with which the battery 51a is charged, is transferred to the battery 51b, and the battery 51b is charged with the electric power.

Accordingly, in the ninth embodiment, even though a plurality of batteries respectively have a residual electric power, the residual electric powers can be transferred to the battery 51b to charge the battery 51b with the residual electric powers.

Embodiment 10

Figure 15:
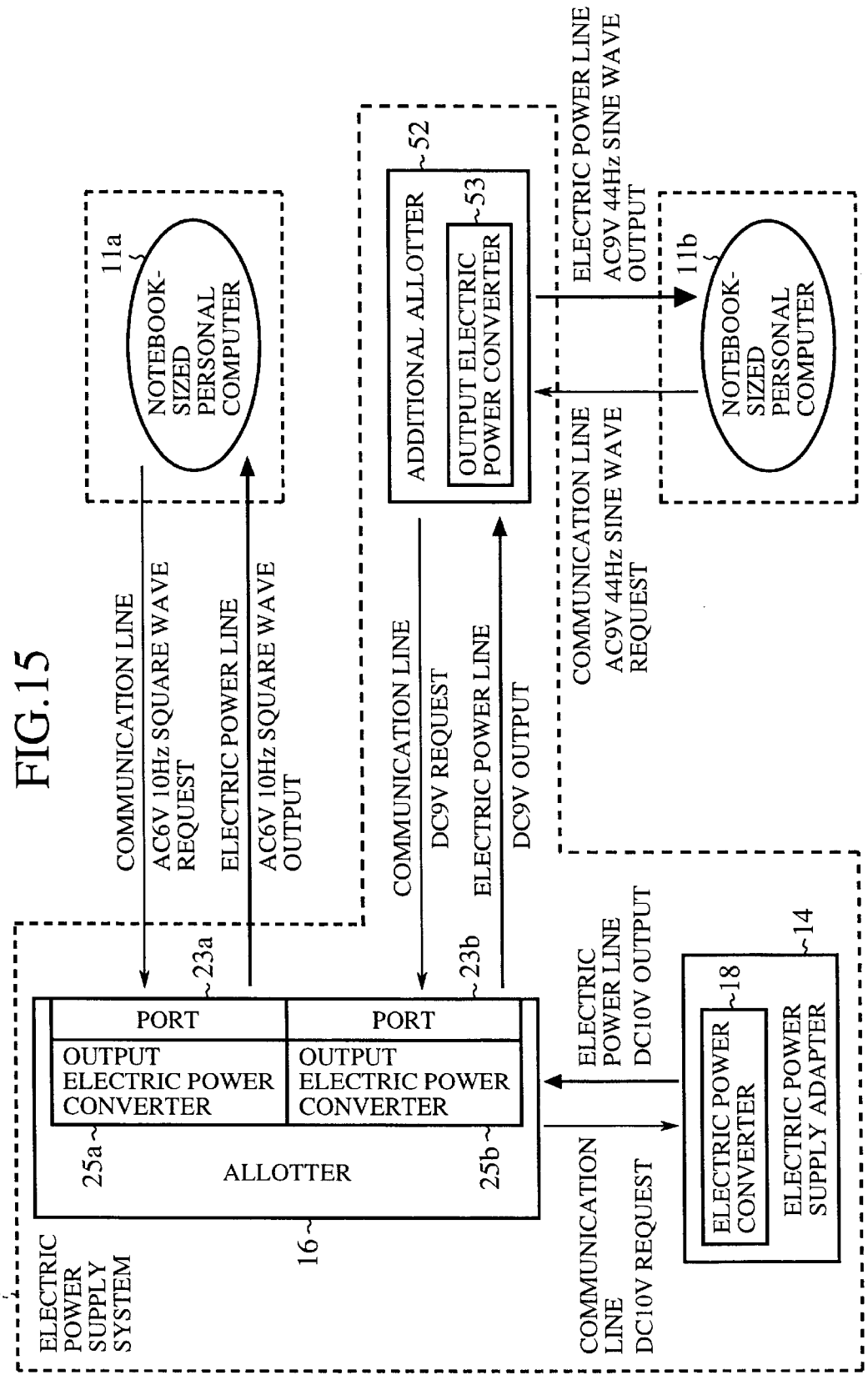
FIG. 15 is an explanatory view showing the electric power supply from an additional allotter to a notebook-sized personal computer according to a tenth embodiment of the present invention.

FIG. 15 is an explanatory view showing the electric power supply from an additional allotter to a personal computer according to a tenth embodiment of the present invention. In FIG. 15, 16 indicates the allotter having two ports placed on the electric power output side and one port (not shown) placed on the electric power input side. 52 indicates an additional allotter of the power-side hardware which has a communication function and an electric power adjusting function and is connected with the allotter 16 through a communication line and an electric power line. The additional allotter 52 has one port (not shown) placed on the electric power output side and one port (not shown) placed on the electric power input side. 11a indicates the personal computer, connected with one port placed on the electric power output side of the allotter 16 through a communication line and an electric power line, for receiving an electric power from the allotter 16. 11b indicates the personal computer, connected with one port placed on the electric power output side of the additional allotter 52 through a communication line and an electric power line, for receiving an electric power from the additional allotter 52. 14 indicates the electric power supply adapter, connected with the port placed on the electric power input side of the allotter 16 through a communication line and an electric power line, for supplying an electric power required by the allotter 16 to the allotter 16.

Also, 18 indicates the electric power converter, arranged in the electric power supply adapter 14, for converting an electric power supplied from the outside into another electric power according to electric power data sent from the allotter 16. An AC-to-DC converter or a DC-to-DC converter is used as the electric power converter 18. In the allotter 16, 23a indicates the port which is placed on the electric power output side of the allotter 16 and is connected with the personal computer 11a, 23b indicates the port which is placed on the electric power output side of the allotter 16 and is connected with the additional allotter 52, 25a indicates the output electric power converter for converting the electric power, which is supplied from the electric power supply adapter 14 to the allotter 16, into an electric power according to electric power data sent from the personal computer 11a, and 25b indicates the output electric power converter for converting the electric power, which is supplied from the electric power supply adapter 14 to the allotter 16, into an electric power according to electric power data sent from the additional allotter 52. A-DC-to-AC converter is used as the output electric power converter 25a, and a DC-to-DC converter is used as the output electric power converter 25b. 53 indicates the output electric power converter, arranged in the additional allotter 52, for converting the electric power, which is supplied from the allotter 16 to the additional allotter 52, into an electric power according to electric power data sent from the personal computer 11b. A DC-to-AC converter is used as the output electric power converter 53.

Next, an operation in the electric power supply is described.

The personal computer 11a communicates with the allotter 16 through the communication line to send electric power data, which indicates an electric power (for example, an AC electric power of 6 V and 10 Hz square wave) suited to the personal computer 11a, to the allotter 16. The personal computer 11b communicates with the additional allotter 52 through the communication line to send electric power data, which indicates an electric power (for example, an AC electric power of 9 V and 44 Hz sine wave) suited to the personal computer 11b, to the additional allotter 52. The allotter 16 communicates with the electric power supply adapter 14 through the communication line. When the additional allotter 52 receives the electric power data of the personal computer 11b, the additional allotter 52 sends electric power data, which indicates an appropriate electric power (for example, a DC electric power of 9 V), to the allotter 16. When the allotter 16 receives the electric power data of the additional allotter 52 and the electric power data of the personal computer 11a, the allotter 16 sends electric power data, which indicates an electric power (for example, a DC electric power of 10 V) required by the allotter 16, to the electric power supply adapter 14.

In the electric power supply adapter 14, an electric power supplied from the outside is converted into a DC electric power of 10 V, which matches with the electric power data of the allotter 16, by using either an AC-to-DC converter or a DC-to-DC converter of the electric power converter 18, and the converted electric power is supplied to the allotter 16. In the allotter 16, the DC electric power of 10 V received from the electric power supply adapter 14 is converted into an AC electric power of 6 V. and 10 Hz square wave, which matches with the electric power data of the personal computer 11a, by using a DC-to-AC converter of the output electric power converter 25a, and the AC electric power of 6 V and 10 Hz square wave is supplied to the personal computer 11a through the electric power line. Therefore, the electric power appropriate to the personal computer 11a can be supplied from the allotter 16 to the personal computer 11a.

Also, in the allotter 16, the DC electric power of 10 V received from the electric power supply adapter 14 is converted into a DC electric power of 9 V, which matches with the electric power data of the additional allotter 52, by using a DC-to-DC converter of the output electric power converter 25b, and the DC electric power of 9 V is supplied to the additional allotter 52 through the electric power line. When the additional allotter 52 receives the DC electric power of 9 V, the DC electric power of 9 V is converted into an AC electric power of 9 V and 44 Hz sine wave, which matches with the electric power data of the personal computer 11b, by using a DC-to-AC converter of the output electric power converter 53, and the AC electric power of 9 V and 44 Hz sine wave is supplied to the personal computer 11b through the electric power line. Therefore, the electric power appropriate to the personal computer 11b can be supplied from the allotter 16 to the personal computer 11b.

In this embodiment, only one additional allotter 52 is connected with the allotter 16. However, it is applicable that a plurality of additional allotters be connected with the allotter 16. Also, it is applicable that one or more additional allotters be serially connected with the additional allotter 52 to arrange a series of additional allotters (or a plurality of serial-additional allotters).

Accordingly, in the tenth embodiment, an electric power appropriate to each of a plurality of personal computers representing the consumption-side hardware can be supplied to the personal computer by using a plurality of allotters (the allotter 16 and the additional allotter 52) of the power-side hardware serially arranged.

Embodiment 11

Figure 16:
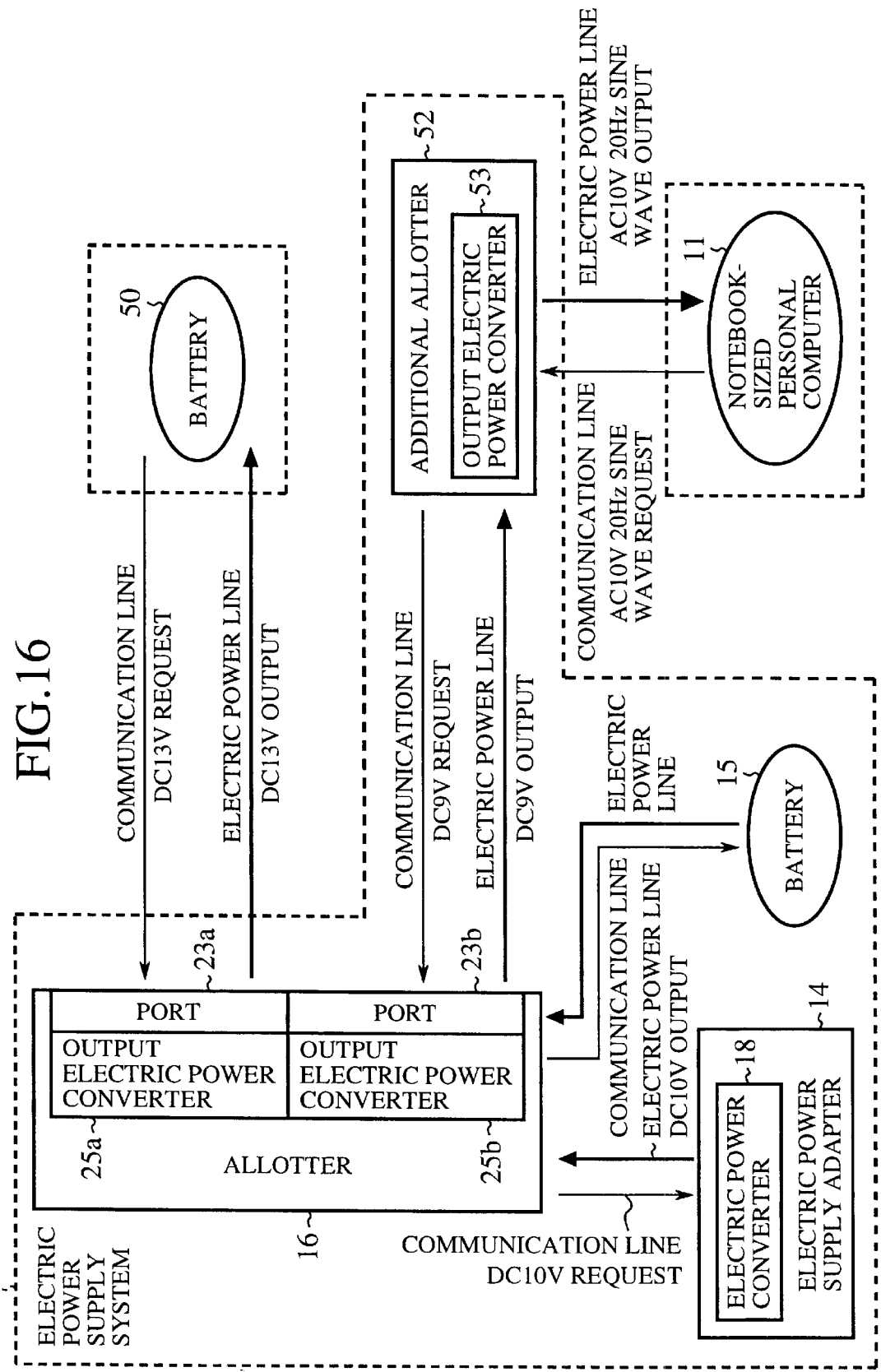
FIG. 16 is an explanatory view showing the electric power supply to a notebook-sized personal computer and the battery charging according to an eleventh embodiment of the present invention.

FIG. 16 is an explanatory view showing the electric power supply to a personal computer and the battery charging according to an eleventh embodiment of the present invention. In FIG. 16, 16 indicates the allotter having two ports placed on the electric power output side and two ports (not shown) placed on the electric power input side. 52 indicates the additional allotter of the power-side hardware-which is connected with the allotter 16 through a communication line and an electric power line. The additional allotter 52 has one port (not shown) placed on the electric power output side and one port (not shown) placed on the electric power input side. 50 indicates the battery of the consumption-side hardware. The battery 50 is connected with one port placed on the electric power output side of the allotter 16 through a communication line and an electric power line and is charged with an electric power supplied from the allotter 16. 11 indicates the personal computer, connected with one port placed on the electric power output side of the additional allotter 52 through a communication line and an electric power line, for receiving an electric power from the additional allotter 52. 15 indicates the battery of the power-side hardware, connected with one port placed on the electric power input side of the allotter 16 through a communication line and an electric power line, for supplying an electric power to the allotter 16. 14 indicates the electric power supply adapter, connected with the port placed on the electric power input side of the allotter 16 through a communication line and an electric power line, for supplying an electric power, which is required by the allotter 16 and has the same voltage as an output voltage of the battery 15, to the allotter 16.

Also, 18 indicates the electric power converter, arranged in the electric power-supply adapter 14, for converting an electric power supplied from the outside into another electric power, which has the same voltage as an output voltage of the battery 15, according to electric power data sent from the allotter 16. An AC-to-DC converter or a DC-to-DC converter is used as the electric power converter 18. In the allotter 16, 23a indicates the port which is placed on the electric power output side of the allotter 16 and is connected with the battery 50, 23b indicates the port which is placed on the electric power output side of the allotter 16 and is connected with the additional allotter 52, 25a indicates the output electric power converter for converting the electric power, which is supplied from the electric power supply adapter 14 and the battery 15 to the allotter 16, into an electric power according to electric power data sent from the battery 50, and 25b indicates the output electric power converter for converting the electric power, which is supplied from the electric power supply adapter 14 and the battery 15 to the allotter 16, into an electric power according to electric power data sent from the additional allotter 52. A DC-to-DC converter is used as each of the output electric power converters 25a and 25b. 53 indicates the output electric power converter, arranged in the additional allotter 52, for converting the electric power, which is supplied from the allotter 16 to the additional allotter 52, into an electric power according to electric power data sent from the personal computer 11. A DC-to-AC converter is used as the output electric power converter 53.

Next, an operation in the electric power supply and the battery charging is described.

The battery 50 communicates with the allotter 16 through the communication line to send charging data, which indicates an electric power (for example, a DC electric power of 13 V). appropriate to the battery 50, to the allotter 16. The personal computer 11 communicates with the additional allotter 52 through the communication line to send electric power data, which indicates an electric power (for example, an AC electric power of 10 V and 20 Hz sine wave) suited to the personal computer 11, to the additional allotter 52. The allotter 16 communicates with the electric power supply adapter 14 and the battery 15 through the communication lines. In cases where the battery 15 has no communication function, the allotter 16 does not communicate with the battery 15.

When the additional allotter 52 receives the electric power data of the personal computer 11, the additional allotter 52 sends electric power data, which indicates an appropriate electric power (for example, a DC electric power of 9 V), to the allotter 16. When the allotter 16 receives the electric power data of the additional allotter 52 and/or the electric power data of the battery 50, the allotter 16 detects a DC output voltage of the battery 15 and sends electric power data indicating an electric power (for example, a DC electric power of 10 V), which is required by the allotter 16 and is the same as the DC output voltage of the battery 15, to the electric power supply adapter 14.

In the electric power supply adapter,14, an electric power supplied from the outside is converted into a DC electric power of 10 V, which matches with the electric power data of the allotter 16, by using an AC-to-DC converter or a DC-to-DC converter of the electric power converter 18, and the converted electric power is supplied to the allotter 16. Also, the allotter 16 receives another DC electric power of 10 V from the battery 15. In the allotter 16, the DC electric powers of 10 V received from both the electric power supply adapter 14 and the battery 15 are converted into a DC electric power of 13 V, which matches with the electric power data of the battery 50, by using a DC-to-DC converter of the output electric power converter 25a, and the DC electric power of 13 V is supplied to the battery 50 through the electric power line. Therefore, the electric power appropriate to the battery 50 can be supplied from the allotter 16 to the battery 50.

Also, in the allotter 16, the DC electric powers of 10 V received from both the electric power supply adapter 14 and the battery 15 are converted into a DC electric power of 9 V, which matches with the electric power data of the additional allotter 52, by using a DC-to-DC converter of the output electric power converter 25*b,* and the DC electric power of 9 V is supplied to the additional allotter 52 through the electric power line. When the additional allotter 52 receives the DC electric power of 9 V, the DC electric power of 9 V is converted into an AC electric power of 10 V and 20 Hz sine wave, which matches with the electric power data of the personal computer 11, by using a DC-to-AC converter of the output electric power converter 53, and the AC electric power of 10 V and 20 Hz sine wave is supplied to the personal computer 11 through the electric power line. Therefore, the electric power appropriate to the personal computer 11 can be supplied from the allotter 16 to the personal computer 11.

In this embodiment, the allotter 16 and the additional allotter 52 are serially arranged in the same manner as in the tenth embodiment. However, it is applicable that the personal computer 11 and the battery 50 representing the consumption-side hardware be connected with the allotter 16 without a serial arrangement of the allotter 16 and the additional allotter 52.

Accordingly, in the eleventh embodiment, even though the electric power supplied from the electric power supply adapter 14 is insufficient in the allotter 16, because the electric power is supplied from the battery 15 to the allotter 16, the allotter 16 can sufficiently receive the electric power from both the electric power supply adapter 14 and the battery 15. Also, each of the electric power supply adapter 14 and the battery 15 can be used as a DC driving apparatus, an AC driving apparatus or a charging unit.

Embodiment 12

Figure 17:
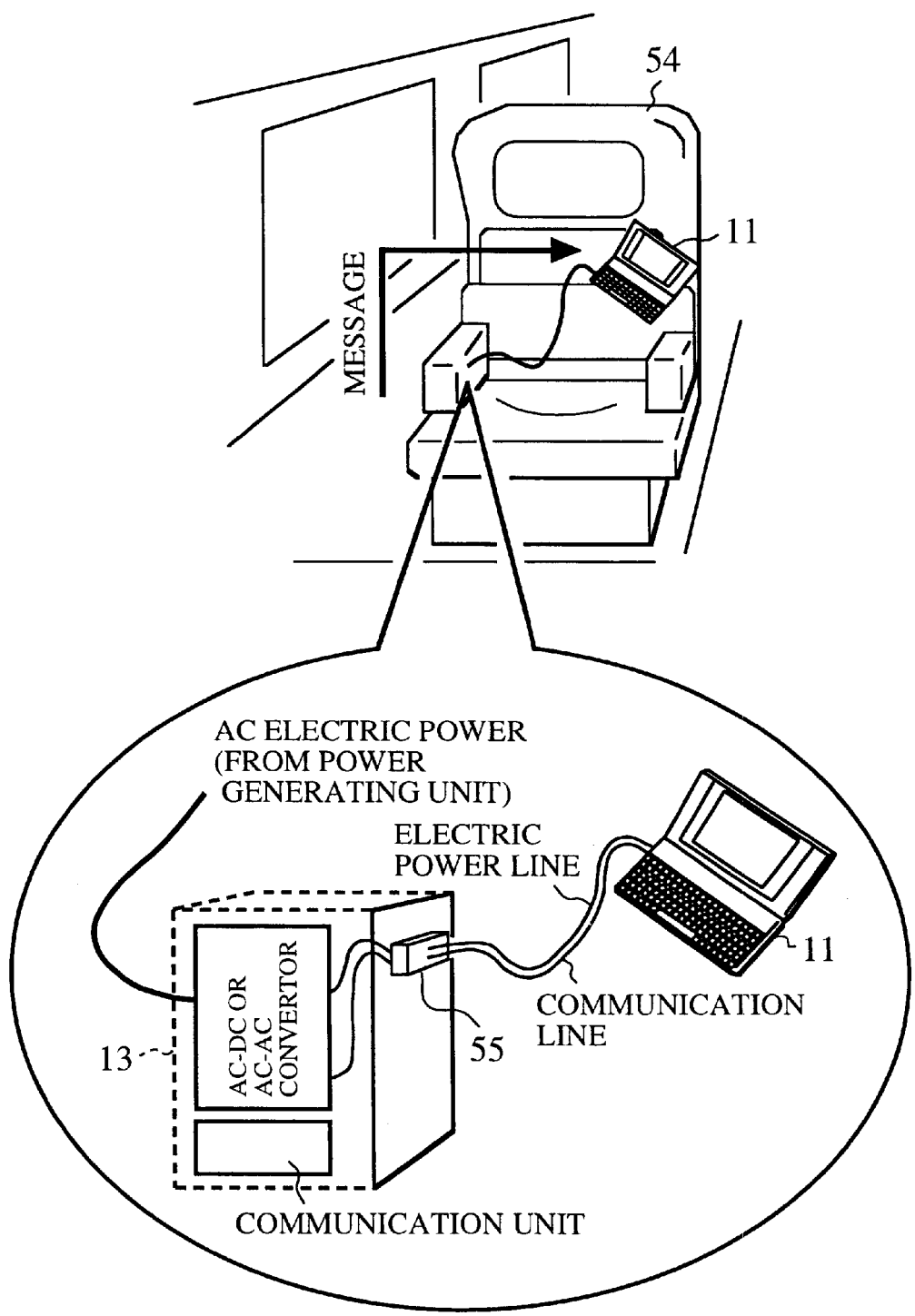
FIG. 17 is a conceptual view showing an electric power supply. system placed in a movable body according to a twelfth embodiment of the present invention.

FIG. 17 is a conceptual view showing an electric power supply system placed in a movable body according to a twelfth embodiment of the present invention. In this embodiment, the electric power supply system according to one of the first to eleventh embodiments is placed in a movable body such as the Japanese Shinkansen (denoting a new high-speed train), an airplane or a motorcar. In FIG. 17, 11 indicates the personal computer, and 13 indicates the electric power supply system according to one of the first to eleventh embodiments. 54 indicates a seat of the Japanese Shinkansen, and the electric power supply system 13 is fixedly arranged into the seat 54. 55 indicates a connector for connecting both the electric power line and the communication line of the personal computer 11 with: the electric power supply system 13.

Next, an operation is described.

In cases where a user uses the personal computer 11 in the Shinkansen, an electric cable (composed of the electric power line and the communication line) of the personal computer 11 is inserted into the connector 55 to connect the personal computer 11 with the electric power supply system 13 buried in the seat 54. Thereafter, electric power data, which indicates an electric power suited to the personal computer 11, is sent to the electric power supply system 13 through the communication line. In the electric power supply system 13, because an AC electric power is supplied from a power generating unit of the Shinkansen to the electric power supply system 13, the AC electric power is converted into a DC electric power matching with the electric power data sent from the personal computer 11, and the converted DC electric power is supplied to the personal computer 11 through the electric power line. Here, in cases where the electric power supply system 13 has a function for not supplying an electric power from the electric power supply system 13 to a specific type of unit, the supply of the electric power to a specific type of battery, in which there is a high probability of fire production, can be prevented. Therefore, the electric power supply system 13 can be placed in the air plane in which the production of fire is very dangerous.

Figure 18:
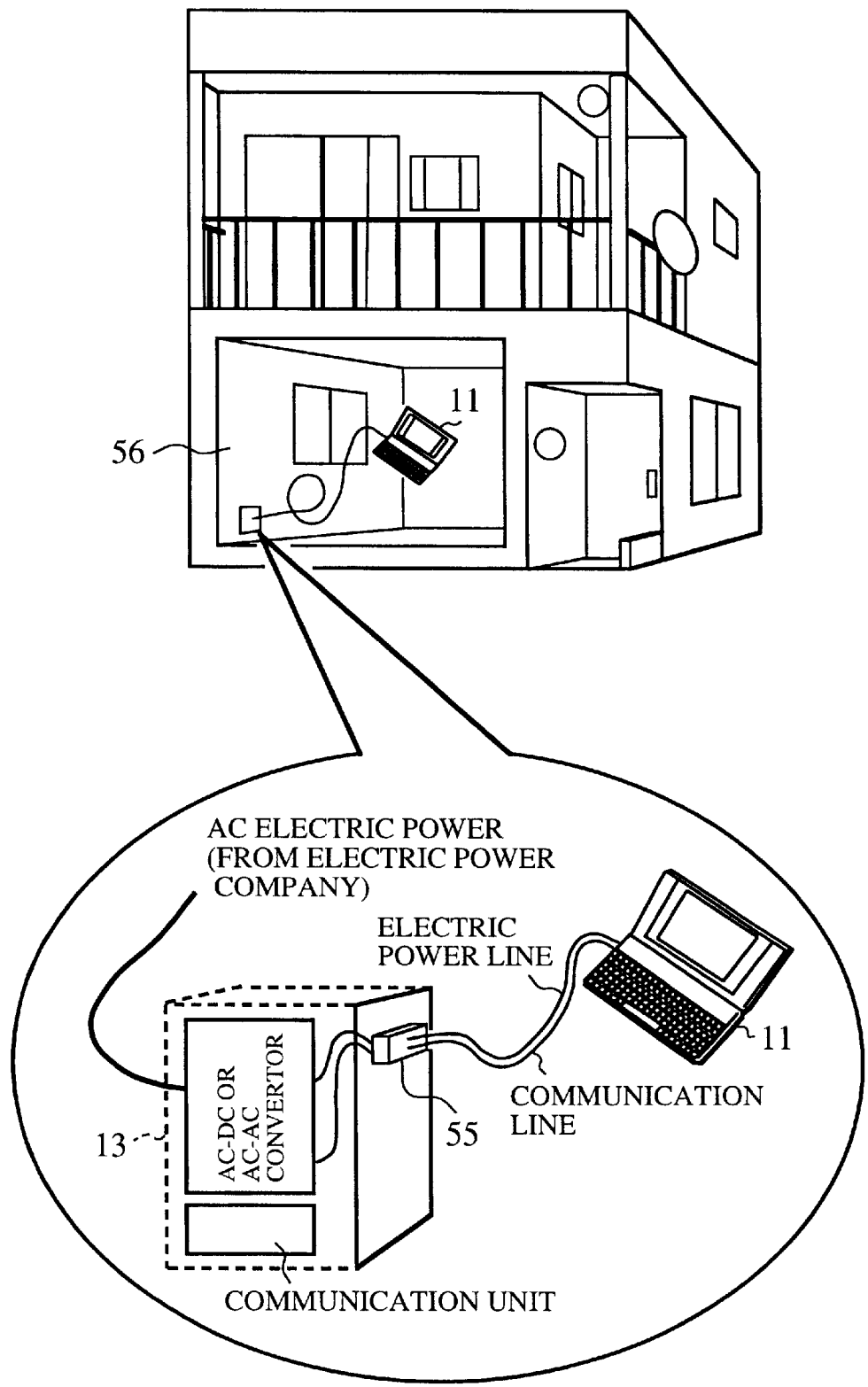
FIG. 18 is a conceptual view showing an electric power supply system placed in a building according to the twelfth embodiment of the present invention.

FIG. 18 is a conceptual view showing an electric power supply system placed in a building according to the twelfth embodiment of the present invention. An electric power supply system shown in FIG. 18 is placed in a building such as a hotel used for travel, a public institution .or a private house. In FIG. 18, 11 indicates the personal computer. 13 indicates the electric power supply system according to one of the first to eleventh embodiments. 56 indicates a fixed wall of a building in which the electric power supply system is buried. 55 indicates the connector which is the same as that shown in FIG. 17.

Next, an operation is described.

In cases where a user uses the personal computer 11 in the building, an electric cable (composed of the electric power line and the communication line) of the personal computer 11 is inserted into the connector 55 to connect the personal computer 11 with the electric power supply system 13 buried in the wall 56 of the building. Thereafter, electric power data, which indicates an electric power suited to the personal computer 11, is sent to the electric power supply system 13 through the communication line. In the electric power supply system 13, because an AC electric power is supplied from an electric power company to the electric power supply system 13, the AC electric power is converted into a DC electric power matching with the electric power data sent from the personal computer 11, and the converted DC electric power is supplied to the personal computer 11 through the electric power line. Here, in cases where the electric power supply system 13 has a function for not supplying an electric power to a noise-generating electronic apparatus such as an audio apparatus, the supply of the electric power to the noise-generating electronic apparatus can be prevented. This function is useful in cases where the electric power supply system 13 is placed in a public institution (for example, a hospital, a theater or a library) in which noise reduction is important.

In this embodiment, the DC electric power is supplied from the electric power supply system 13 to the personal computer 11. However, a DC electric power or an AC electric power can be supplied to other electronic apparatuses. Also, in cases where a battery of the consumption-side hardware has a communication function, the battery can be charged with an electric power supplied from the electric, power supply system 13. Also, in cases where a data communication is performed between an electric power fee collecting system and the personal computer 11 through the electric power supply system 13 and the communication line, the user can know an electric fee for the electric power supplied from the electric power supply system 13 in the Shinkansen, an airplane or a public institution. In this case, in cases where a message can be displayed in the electric power supply system 13, a message "Electric fee for used electric power is ¥120. Charging for Li-ion battery is impossible" can be displayed for the user, and the user can pay the electric fee in the electric power supply place.

Accordingly, in the twelfth embodiment, even though the user does not have an adapter privately used for his personal computer 11, the user can use the personal computer 11 in any place other than his house or office. Also, even though the user does not have a battery charger, for his battery when he stays in a movable body or a building, the user can charge the battery. Also, even though the user stays in a building of a foreign country in which a DC electric power differs from that of his country, in cases where the electric power supply system 11 is fixedly arranged in the building, the user can use his personal computer 11. Also, in cases where the electric power supply system 13 has a function for not supplying an electric power to a specific type of unit, the electric power supply can be prevented in a dangerous place, and the electric power supply to an inadequate electronic apparatus can be prevented.

Embodiment 13

Figure 19:
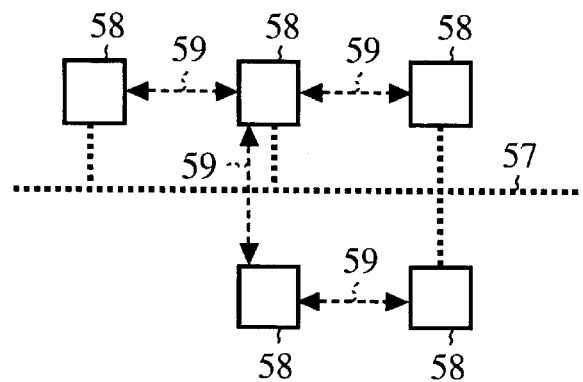
FIG. 19 is a system configuration diagram showing a connection relationship of devices of the power-side hardware composing an electric power supply system in a communication network according to a thirteenth embodiment of the present invention.

FIG. 19 is a system configuration diagram showing a connection relationship of devices of. the power-side hardware composing an electric power supply system in a Communication network according to a thirteenth embodiment of the present invention. In FIG. 19, 57 indicates a network line of a communication network used for a high-speed data communication, for example, based on IEEE (The Institute of Electrical and Electronic Engineers, Inc.) 1394a. 58 indicates each of a plurality of node apparatuses connected with the network line 57. Terminal apparatuses (not shown) is connected with the node apparatuses 58 through the network line 57 or inter-adjacent communication lines. The node apparatuses 58 denote the electric power supply adapter 14, the allotter 16 and the battery 15 representing the power-side hardware. The terminal apparatuses denote the personal computer 11 and audio home electronic apparatus representing the consumption-side hardware. 59 indicates the plurality of inter-adjacent communication lines connecting the node apparatuses 58 with each other. Electric power data, which indicates a maximum electric power possible to be currently output and internal statuses, is transmitted through each inter-adjacent communication line in the communication between the node apparatuses 58.

Here, the network line 57 is formed in a bus type connection, and the inter-adjacent communication lines 59 are formed in a tree type connection. However, other specifications such as electric specifications are arbitrary in the network line 57 and the inter-adjacent communication lines 59.

Figure 20:
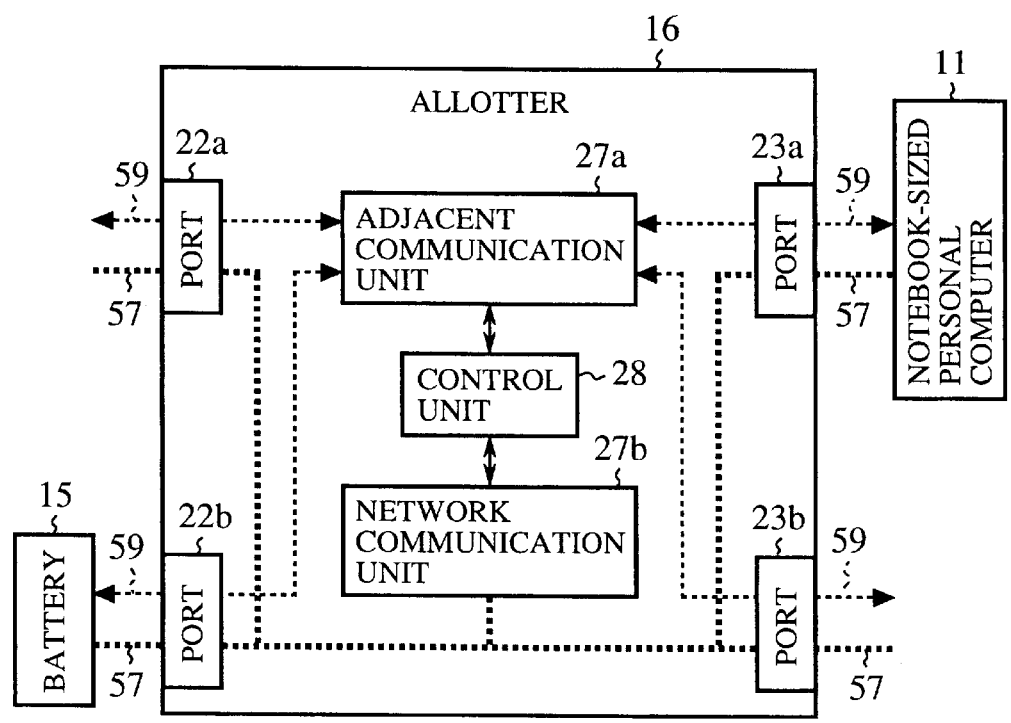
FIG. 20 is a block diagram showing a configuration example of the allotter of the power-side hardware used as one node apparatus.

Also, FIG. 20 is a block diagram showing a configuration example of the allotter 16 representing the power-side hardware which is used as one node apparatus 58. In FIG. 20, 16 indicates the allotter. 11 indicates the personal computer which is used as one terminal apparatus and is connected with the allotter 16 through the network line 57 or one inter-adjacent communication line 59. 15 indicates the battery having a communication function. In the allotter 16, 22a and 22b indicate two ports placed on the electric power input side, 23a and 23b indicate two ports placed on the electric power output side, 27a indicates an adjacent communication unit for performing a communication to transmit electric power data through one inter-adjacent communication line 59, one port 22a or 22b, one port 23a or 23b and another inter-adjacent communication line 59, and 27b indicates a network communication unit for performing a high-speed data communication, for example, based on IEEE1394a to transmit data through the network line 57, one port 22a or 22b, one port 23a or 23b and the network line 57. 28 indicates a control unit for controlling an electric power conversion, the preparation of a systematic diagram of a group of devices in the whole electric power supply system 13 and the recognition of a position of each device in the electric power supply system 13 according to the data received in both the adjacent communication unit 27a and the network communication unit 27b. In cases where either the network line 57 or the inter-adjacent communication line 59 is hung up, the communication in the hung-up line 57 (or 59) is made up by using the other line 59 (or 57). Therefore, even though each device of the power-side hardware is arbitrarily connected with another device of the power-side hardware, the network line 57 of a bus type connection and the inter-adjacent communication lines 59 of a tree type connection can be automatically formed.

Next, an operation is described.

Because devices representing the power-side hardware and devices representing the consumer-side hardware are connected with each other through the electric cables (or wires) in the electric power supply system 13 according to this thirteenth embodiment, as shown in FIG. 19, the devices of the electric power supply system 13 can be used as the infrastructure of the communication network. In the general communication performed by using the electric power supply system 13, electric power data is transmitted between devices of the power-side hardware adjacent to each other through one inter-adjacent communication line 59 and is transmitted between one device of the power-side hardware and one device of the consumer-side hardware through one inter-adjacent communication line 59. However, in cases where the data communication is performed by using only the inter-adjacent communication lines 59, the transmission of the electric power data from one device to another device is repeatedly performed. Therefore, the transmission of the electric power data is delayed, and it, is difficult to apply the electric power supply system 13 to another use. Therefore, in this embodiment, devices of the power-side hardware are connected with the network line 57 of the communication network as the node apparatuses 58, devices of the consumption-side hardware are connected with the node apparatuses 58. In this case, the electric power supply system can be applied to another use in the future.

A configuration example of the allotter 16 used as one node apparatus 58 is shown in FIG. 20. As shown in FIG. 20, all devices of the electric power supply system 13 are connected with each other in the bus connection, and the allotter 16 denoting one device functions as a node. Because the node apparatuses 58 and the terminal apparatuses are connected with each other in the communication network, the node apparatuses 58 and the terminal apparatuses can be used as the infrastructure based on IEEE1394a or the infrastructure of another high-speed communication. Therefore, the electric power supply system 13 can be used as the infrastructure of a high-speed communication network in the future, and the network communication can be flexibly performed by using the communication systems (the communication system based on the network line 57 and the communication system based on the inter-adjacent communication lines 59) of which the structures differ from each other.

In cases where a network communication is performed by using functions of the electric power supply system, because an inter-adjacent communication using the inter-adjacent communication lines 59 is basically performed in the network communication, it is required to define protocol in the network communication. Here, the network communication is described as an example. In brief, a systematic diagram of a group of devices (the node apparatuses 58 and the terminal apparatuses) connected with each other in the electric power supply system 13 is prepared in the fist stage, a device, to which data is sent from another device, is specified, and the network communication is performed between the devices.

Initially, a systematic diagram indicating a communication network is prepared to perform the data communication between each pair of devices connected with each other in the electric power supply system. Here, the connection of node apparatuses 58 is performed by connecting one port 22a or 22b placed on the electric power input side of one node apparatus 58 with one port 23a or 23b placed on the electric power output side of another node apparatus 58. Hereinafter, the preparation of a systematic diagram indicating a map of a communication network is described.

As rules in the preparation of a systematic diagram, the allotter, which has a port placed on the electric power input side and a port placed on the electric power output side, is called an intermediate connection device. The personal computer and the battery of the consumption-side hardware, which can be connected with only one device, are called a terminal apparatus. In cases where one intermediate connection device receives an electric power from a device connected with the electric power input side of the intermediate connection device, the intermediate connection device also receives a systematic diagram transmission request from the device. (However, in cases where the device, from which the electric power is supplied to the intermediate connection device, is a battery having no communication function, the intermediate connection device detects that the battery has no communication function, it is regarded in the intermediate connection device that the intermediate connection device receives a systematic diagram transmission request from the battery, and a next operation is started.) Thereafter, the intermediate connection device sends the systematic diagram transmission request to an adjacent intermediate connection device and/or a terminal apparatus which are respectively connected with a port placed on the electric power output side of the intermediate connection device. In cases where the adjacent intermediate connection device receives the systematic diagram transmission request from the intermediate connection device, the adjacent intermediate connection device sends the systematic diagram transmission request to another adjacent intermediate connection device and/or a terminal apparatus in the same manner. Also, in cases where the terminal apparatus receives the systematic diagram transmission request from the intermediate connection device, the terminal apparatus sends a systematic diagram of the terminal apparatus, which indicates that the terminal apparatus is a terminator, as a reply to the intermediate connection device with which the terminal apparatus is connected. Also, in cases where no device is connected with a port placed on the electric power output side of the adjacent intermediate connection device, the adjacent intermediate connection device sends a systematic diagram of the adjacent intermediate connection device, which indicates that no device is connected with a port placed on the electric power output side of the adjacent intermediate connection device, as a reply to the intermediate connection device. Therefore, a plurality of systematic diagrams of all devices, which are respectively connected with one of ports placed on the electric power output side of an remarked intermediate connection device are collected in the remarked intermediate connection device. Thereafter, the systematic diagrams are combined with each other in the remarked intermediate connection device to prepare a systematic diagram of the group of devices and the remarked intermediate connection device, and the remarked intermediate connection device sends the systematic diagram of the group of devices and the remarked intermediate connection device to an adjacent intermediate connection device with which a port placed on the electric power input side of the remarked intermediate connection device is connected. Here, in cases where a battery having no communication function is connected with a port placed on the electric power input side of the remarked intermediate connection device, the remarked intermediate connection device prepares and sends out a systematic diagram of the group of devices, the remarked intermediate connection device and the battery. Therefore, in cases where the reply and the combination of systematic diagrams are repeatedly performed, a systematic diagram of a group of all devices in this communication network is finally prepared in an intermediate connection device (or an electric power supply adapter) in which no device is connected with a port placed on the electric power input side of the intermediate connection device. Thereafter, the intermediate connection device sends the systematic diagram of a group of all devices to an adjacent intermediate connection device and/or a terminal device which are respectively connected with a port placed on the electric power output side of the intermediate connection device, and the adjacent intermediate connection device sends the systematic diagram of a group of all devices to another adjacent intermediate connection device and/or a terminal device placed on the electric power output side of the adjacent intermediate connection device. The sending of the systematic diagram of a group of all devices are repeatedly performed until the systematic diagram is sent to the terminal apparatus or the intermediate connection device in which no device is connected with a port placed on the electric power output side of the intermediate connection device. Therefore, the systematic diagram of a group of all devices can be sent to all devices of the communication network.

Next, an example of the preparation of a systematic diagram is described in detail with reference to FIG. 21 to FIG. 24.

Figure 21:
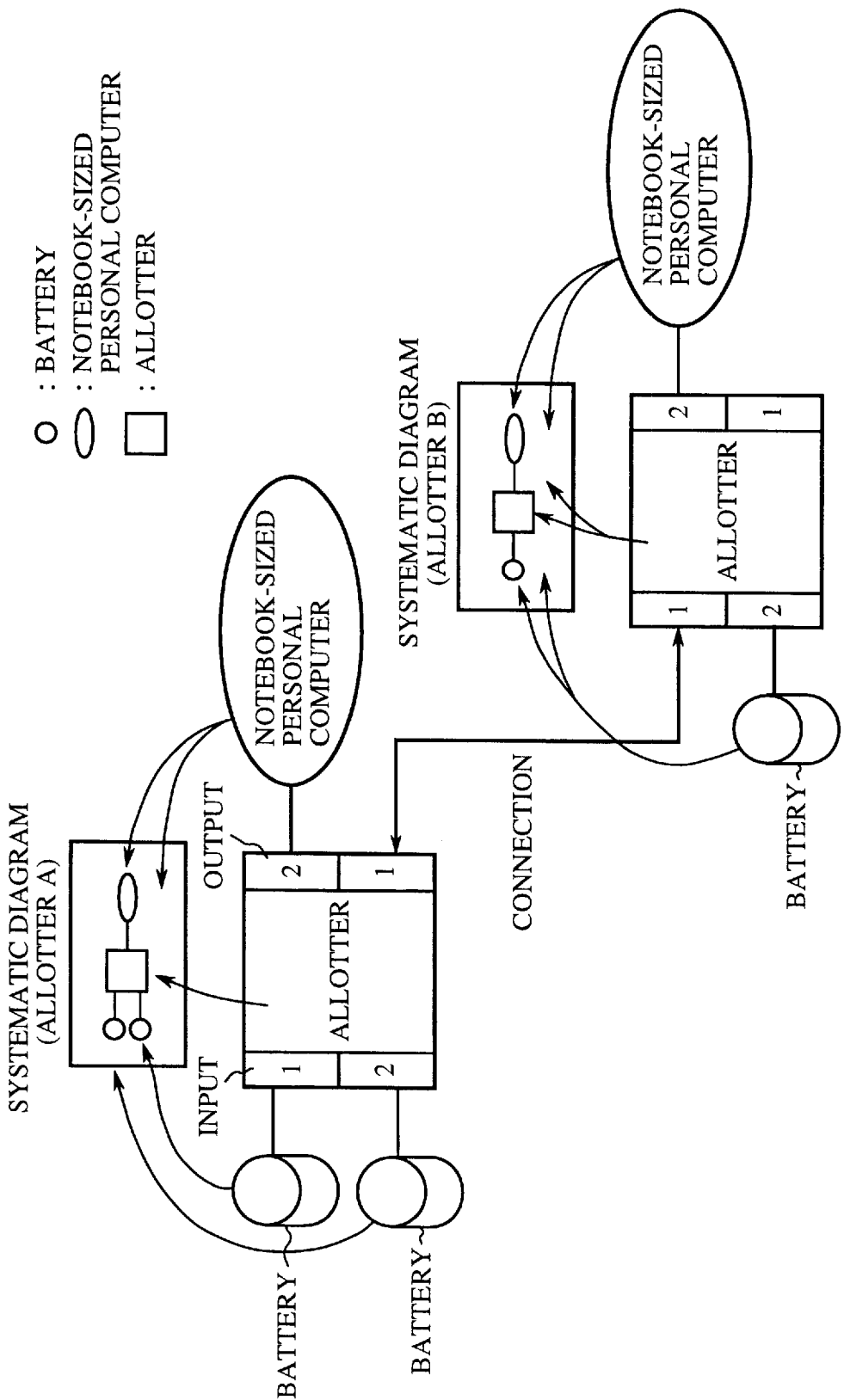
FIG. 21 is an explanatory view showing the preparation of a systematic diagram performed in each device according to the thirteenth embodiment.
Figure 22:
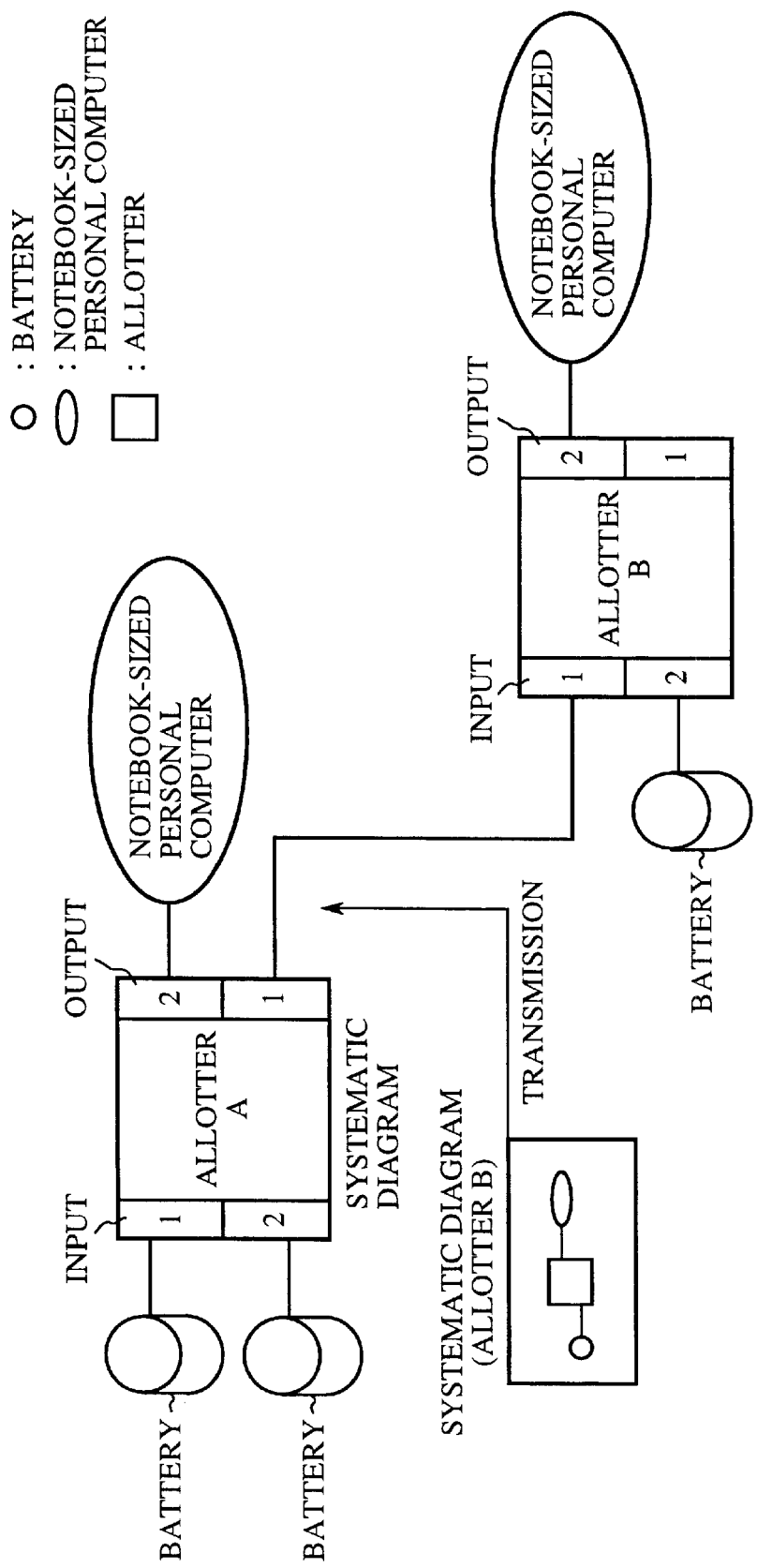
FIG. 22 is an explanatory view showing the sending of the systematic diagram according to the thirteenth embodiment.
Figure 23:
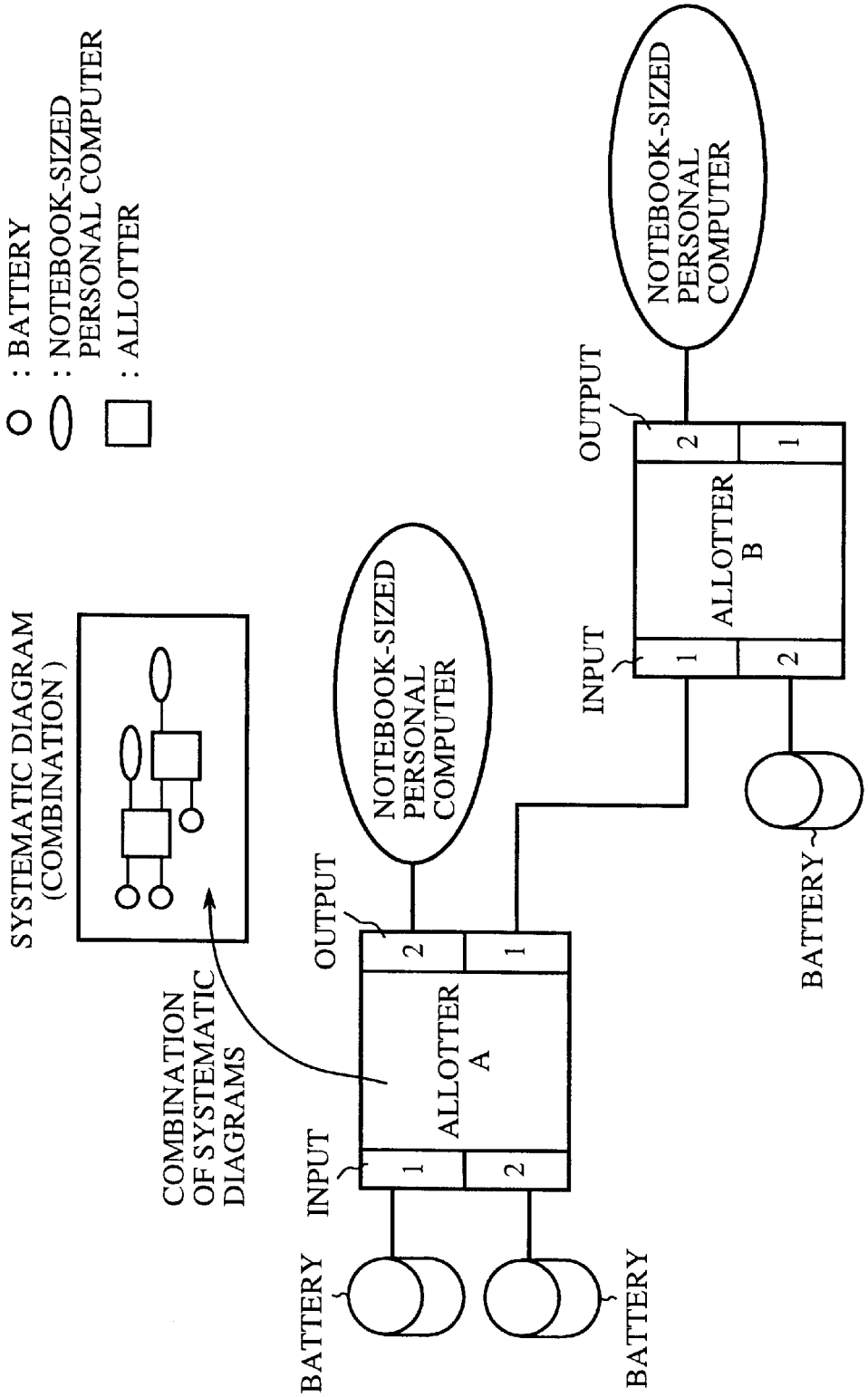
FIG. 23 is an explanatory view showing the combination of the systematic diagrams according to the thirteenth embodiment.

FIG. 21 is an explanatory view showing the preparation of a systematic diagram performed in an allotter A and the preparation of a systematic diagram performed in an allotter B connected with the allotter A according to the thirteenth embodiment, FIG. 22 is an explanatory view showing the sending of the systematic diagram prepared in the allotter B to the allotter A according to the thirteenth embodiment, FIG. 23 is an explanatory view showing the combination of the systematic diagram prepared in the allotter A and the systematic diagram prepared in the allotter B according to the thirteenth embodiment, and FIG. 24 is an explanatory view showing the distribution of a systematic diagram, which is obtained in the allotter B by combining the systematic diagram of the allotter A and the systematic diagram of the allotter B, to all devices according to the thirteenth embodiment.

As shown in FIG. 21, each of all node apparatuses 58 such as allotters has data of its own systematic diagram. In cases where a port of an allotter B placed on its electric power input side is connected with a port of an allotter A placed on its electric power output side, as shown in FIG. 22, data of a systematic diagram, which indicates the allotter B and devices (a battery and a personal computer) connected with the allotter B, is sent from the allotter B to the allotter A. When the allotter A receives the systematic diagram data from the allotter B, as shown in FIG. 23, in the allotter A, data of a systematic diagram, which indicates the allotter A and devices (batteries and a personal computer) connected with the allotter A, is combined with the systematic diagram data received from the allotter B to prepare a systematic diagram of a group of all devices (the allotters A and B and the devices connected with the allotters A and B) in a communication system. Thereafter, as shown in FIG. 24, the allotter A distributes the systematic diagram of a group of all devices to devices (the allotter B and the devices connected with the allotter A) connected with the allotter A. When the allotter B receives the systematic diagram of a group of all devices from the allotter A, the allotter B distributes the systematic diagram of a group of all devices to devices (the battery and the personal computer) connected with the allotter B. Here, arrows shown in FIG. 24 indicate distribution routes of the systematic diagram of a group of all devices.

Next, data of a systematic diagram is described.

Figure 25:
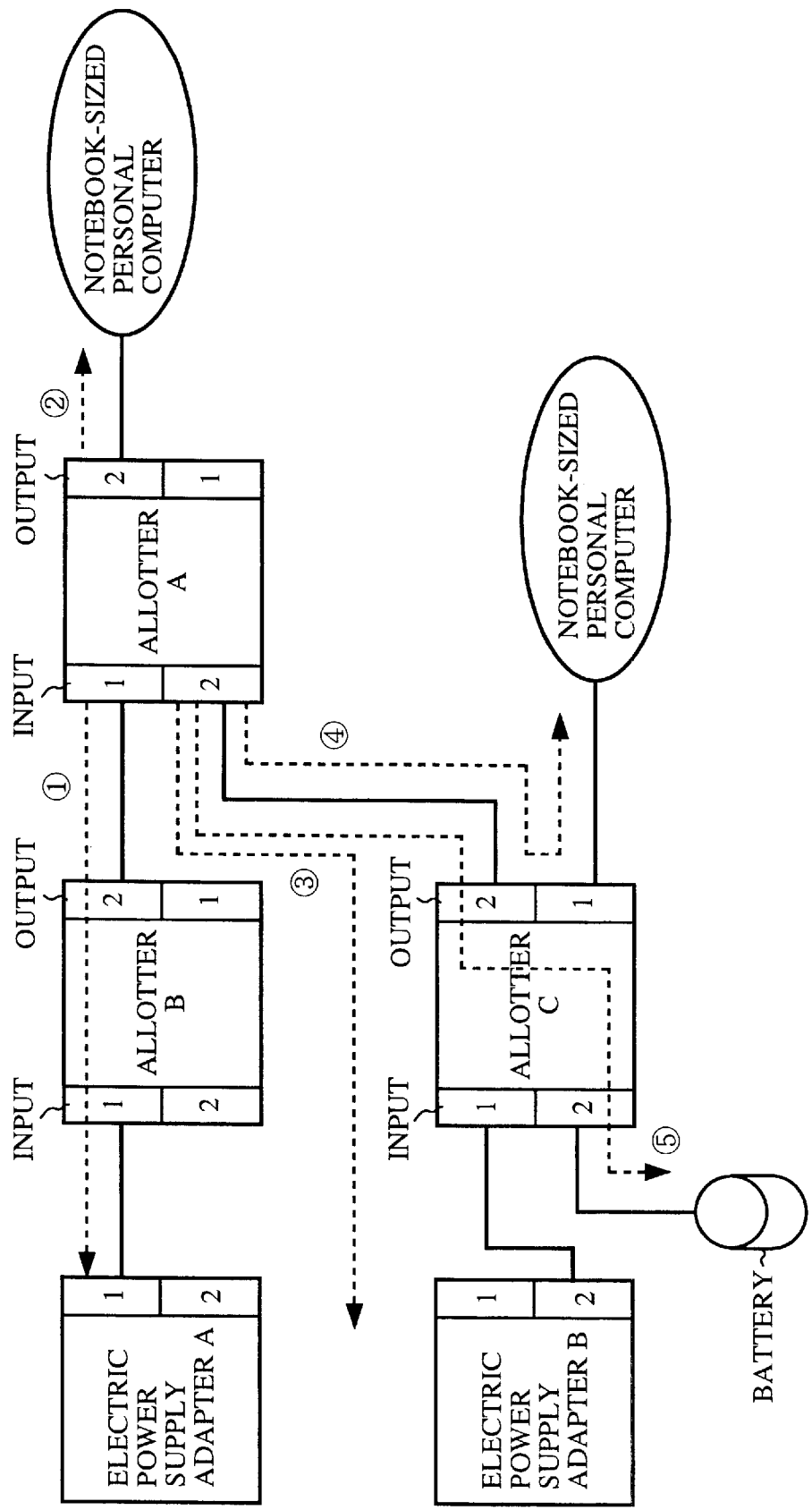
FIG. 25 is an explanatory view showing fifth communication routes in a communication system.

FIG. 25 is an explanatory view showing fifth communication routes respectively extending from an allotter A to a connection terminating device in a communication system. As shown in FIG. 25, an electric power supply system is composed of two electric power supply adapters, three allotters and one battery, and a communication system is composed of the electric power supply system and two personal computers connected with the electric power supply system. Here, each device placed on a connection terminating point is defined as a terminator. That is, the two electric power supply adapters, the battery and the two personal computers are called terminators. Also, the allotter A is set as an observation point. In the example of FIG. 25, the number of communication routes respectively extending from the observation point to one terminator is 5 which is equal to the number of terminators.

Figure 26:
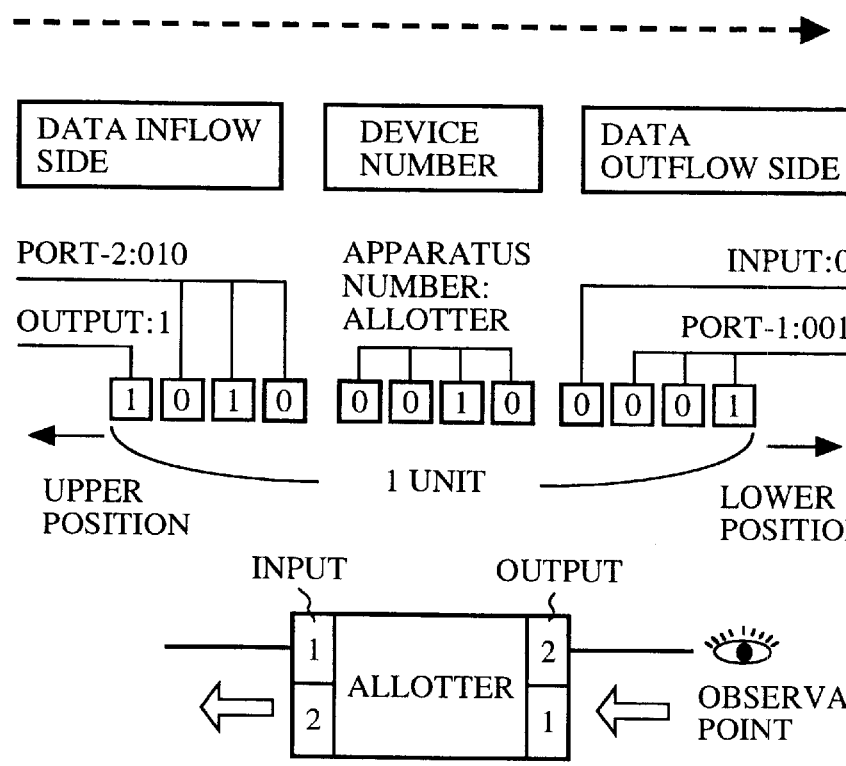
FIG. 26 is an explanatory view showing data of a systematic diagram of one device.

FIG. 26 is an explanatory view showing data of a systematic diagram of one device. As shown in FIG. 26, data of a systematic diagram of each device is composed of 4-bit data indicating data inflow side of the device, 4-bit data of a device number indicating a type of the device and 4-bit data indicating data outflow side of the device. Therefore, data of a systematic diagram of each device is 12-bit data. In this embodiment, 4-bit data of a device number is set to "0001" for an electric power supply adapter, "0010" for an allotter, "0011" for a battery and "0100" for a personal computer. Also, the highest order position bit (or the most significant bit) in each of the 4-bit data indicating data inflow side and the 4-bit data indicating data outflow side is used to identify the input side (or the electric power input side) and the output side (or the electric power output side) of the device. In cases where the highest order position bit of the 4-bit data indicating data inflow side (or the 4-bit data indicating data outflow side) is set to "0", the data inflow side (or the data outflow side) denotes the input side of the device. In contrast, in cases where the highest order position bit is set to "1", the data inflow side (or the data outflow side) denotes the output side of the device. The lower three bits in each of the 4-bit data indicating data inflow side and the 4-bit data indicating data outflow side is used to identify a port of the inlet or outlet. That is, the lower three bits set to "001" indicates a port-1, and the lower three bits set to "010" indicates a port-2. For example, the data "1010" in the data inflow side indicates that data is input to an output port-2 of a device.

Three pieces of 4-bit data of each device are arranged in the order of 4-bit data of the data inflow side, 4-bit data of the device number and 4-bit data of the data outflow side. That is, the 4-bit data of the data inflow side is placed at the upper position, the 4-bit data of the data outflow side is placed at the lower position, and the 4-bit data of the device number is placed at the middle position. Therefore, the arrangement of the three pieces of 4-bit data agrees with a transmission direction of data. Therefore, as shown in FIG. 26, in cases where data-sent from the observation point passes through an output port-2 of an allotter and an input port-1 of the allotter in that order, 4-bit data "1010" of the data outflow side,4-bit data "0010" indicating the allotter and 4-bit data "0001" of the data inflow side arranged in that order indicates data of a systematic diagram of the allotter. That is, data of a systematic diagram of the allotter is indicated by "A21H" ("1010"+"0010"+"0001"). Here, 4-bit data of the data inflow side is not used in a systematic diagram of each terminator, but data "1111" indicating termination is arranged after the 4-bit data of the device number.

Data of a systematic diagram of a group of devices placed in a communication route is obtained by combining data of systematic diagrams of the devices. For example, as shown in FIG. 25, data of the communication ① route passes through the input port-1 of the allotter A (denoting the observation point), the output port-1 of the allotter B, the input port-1 of the allotter B and the output port-1 of the electric power supply adapter A in that order, and the electric power supply adapter A is a terminator. Therefore, a systematic diagram of a group of devices placed in the communication route ① is expressed as follows.

"0001"+"1001"+"0010"(allotter B)+"0001"+"1001"+"0001"(electric power supply adapter A)+"1111"(terminator)="19219FH"

Therefore, data of the systematic diagram of the group of devices placed in each of the communication routes ① to ⑤ can be prepared. Thereafter, a systematic diagram corresponding to all devices in the electric power supply system is prepared in the allotter A from the systematic diagrams of the groups of devices placed in the communication routes ① to ⑤.

Next, a communication procedure in the electric power supply system is described.

Figure 27:
FIG. 27 is an explanatory view showing the structure of the electric power data transmitted in the electric power supply system.

FIG. 27 is an explanatory view showing the structure of the electric power data transmitted in the electric power supply system. As shown in FIG. 27, electric power data transmitted in the electric power supply system is composed of out-going data, communication data and incoming data arranged in that order.

Figure 28A:
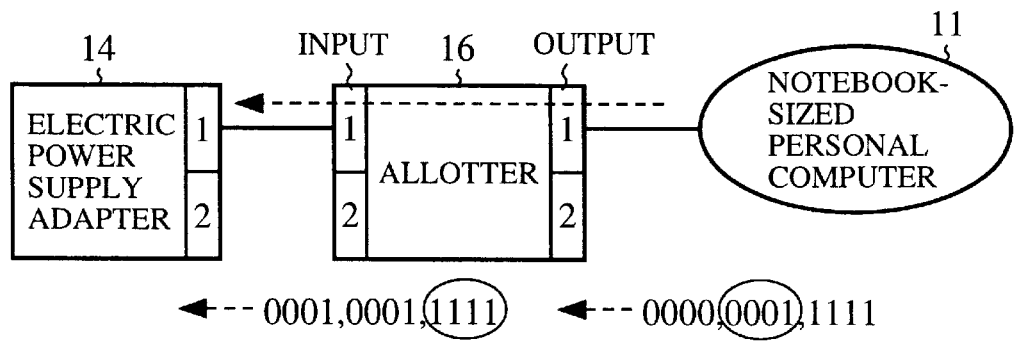
FIG. 28A is an explanatory view showing a communication procedure in which the personal computer communicates with the electric power supply adapter through the allotter while specifying the electric power supply adapter according to out-going data of the electric power data.
Figure 28B:
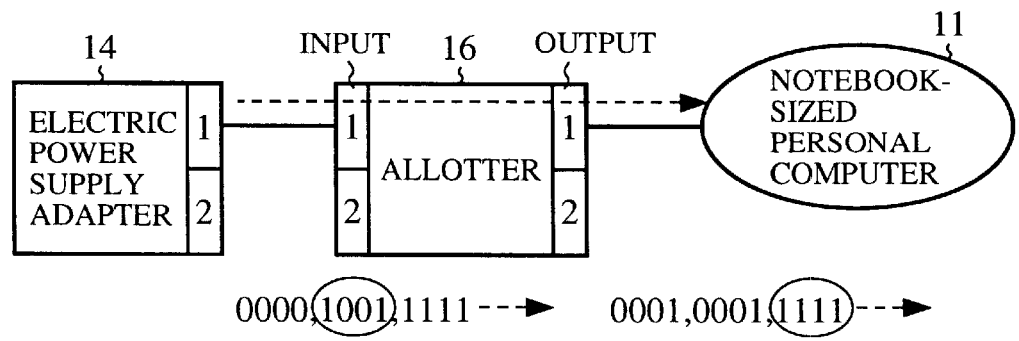
FIG. 28B is an explanatory view showing a communication procedure in which the electric power supply adapter replies to the personal computer through the allotter while specifying the personal computer according to incoming data of the electric power data.
Figure 28C:
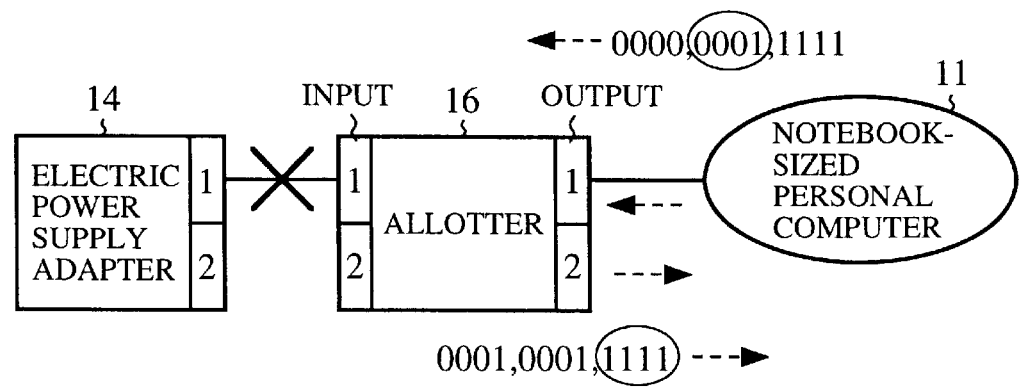
FIG. 28C is an explanatory view showing a communication procedure in which a reply is sent from the allotter to the personal computer in cases where a communication error occurs.
Figure 29:
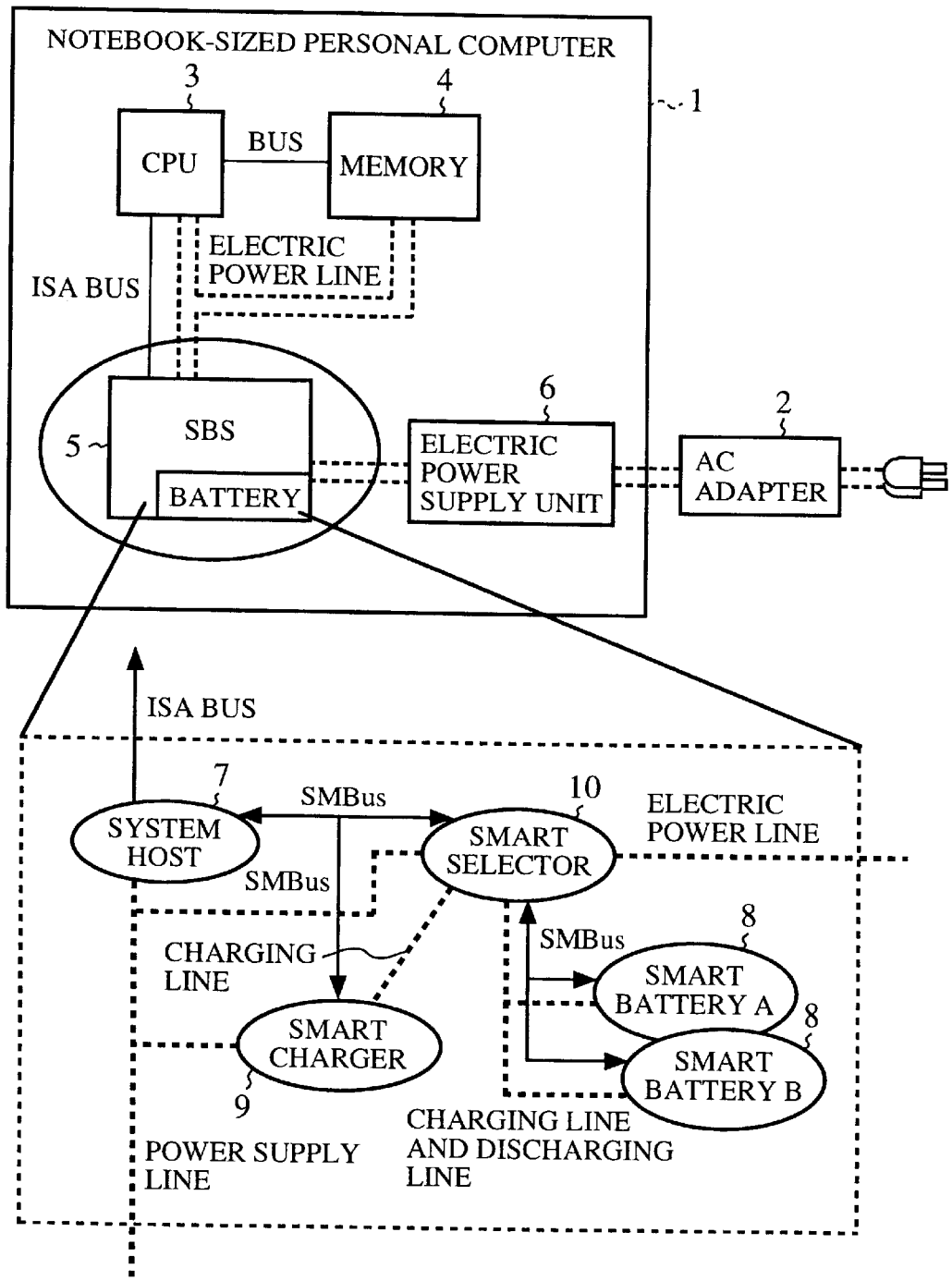
FIG. 29 is a block diagram showing a conventional electric power supply system arranged in a notebook-sized personal computer.

FIG. 28A is an explanatory view showing a communication procedure in which the personal computer 11 communicates with the electric power supply adapter 14 through the allotter 16 while specifying the electric power supply adapter 14, with which the personal computer 11 desires to communicate, according to the out-going data. FIG. 28B is an explanatory view showing a communication procedure in which the electric power supply adapter 14 replies to the personal computer 11 through the allotter 16 while specifying the personal computer 11, from which the communication data is transmitted to the electric power supply adapter 14, according to the incoming data. FIG. 28C is an explanatory view showing a communication procedure in which a reply is sent from the allotter 16 to the personal computer 11 in cases where a communication error occurs.

When a user desires to transmit the electric power data from the consumption-side hardware (for example, the personal computer 11) to one terminator (for example, the electric power supply adapter 14) through one or more intermediate devices, the out-going data and the incoming data of the electric power data are prepared in the consumption-side hardware from which the electric power data is planned to be transmitted to the terminator. The out-going data is prepared by serially arranging counter data "0000", one or more pieces of 4-bit data of the data outflow sides of the intermediate devices and terminator data "1111" in that order. In this case, the piece of 4-bit data of the data outflow side of each intermediate device is extracted from the systematic diagram of the intermediate device, and the arranging order of the pieces of 4-bit data of the data outflow sides of the intermediate devices is determined according to the arranging order of the devices in a data transmission direction. When each intermediate device receives the electric power data composed of the out-going data, the communication data and the incoming data, the counter data of the out-going data is incremented by the device. Therefore, each intermediate device can knows the 4-bit data of the data outflow side corresponding to the intermediate device.

For example, as shown in FIG. 28A, in cases where the electric power data is sent from the personal computer 11 to one electric power supply adapter 14 through one allotter 16, the out-going data "0000"(counter data)+"0001"(4-bit data of the data outflow side of the allotter 16)+"1111"(terminator data)="01FH"

is sent from the electric power data to the allotter 16. In the allotter 16, because the counter data is "0000", it is recognized that the allotter 16 is a first data transmission device. Therefore, the allotter 16 refers to the 4-bit data "0001" arranged in the second place of the out-going data, and it is recognized according to the 4-bit data "0001" that the electric power data should be output from the input port-1. Thereafter, the allotter 16 increments the counter data, and the allotter 16 outputs the out-going data "0001"(counter data)+"0001"(4-bit data of the data outflow side of the allotter 16)+"1111"(terminator data)="11FH"

from the input port-1 according to the 4-bit data "0001". Therefore, the electric power data is sent to the electric power supply adapter 14. In the electric power supply adapter 14, because the counter data is "0001", it is recognized that the electric power supply adapter 14 is a second data transmission device. Therefore, the electric power supply adapter 14 refers to the 4-bit data "1111" (terminator data) arranged in the third place of the out-going data, and it is recognized according to the 4-bit data "1111" that the electric power data is sent to the electric power supply adapter 14. Thereafter, a reply is prepared in the electric power supply adapter 14 in response to the communication data, and the replay is replaced with the communication data sent from the personal computer 11. Thereafter, as shown in FIG. 28B, electric power data, which is composed of the incoming data, reply-communication data indicating the reply and the out-going data arranged in that order, is sent from the electric power supply adapter 14 to the allotter 16. In this case, the incoming data is prepared in the personal computer 11 in the same manner as the outgoing data. Therefore, the electric power communication data is sent from the electric power supply adapter 14 to the personal computer 11 through the allotter 16 according to the incoming data. Therefore, the terminator, to which the electric power data is sent, can be specified according to the out-going data, and the consumer-side hardware, from which the electric power data is sent, can be specified according to the incoming data.

In cases where error such as disconnection of the communication line occurs during the communication, as shown in FIG. 28C, the allotter 16, which detects the occurrence of the error, informs the error of the personal computer 11 according to both the counter data of the out-going data and the incoming data.

Accordingly, in the thirteenth embodiment, the communication network, in which the electric power supply system is included, can be structured, and the electric power supply system can be used as one infrastructure of the high-speed communication network in the future.

Also, the network communication can be flexibly performed in the communication network by using the network line 57 and the inter-adjacent communication line 59 having different structures. Therefore, the electric power supply system can be used not only for the electric power supply but also for the data communication or an electric power fee automatic collecting system using the data communication.

Also, an address can be allocated to each of devices without the host by using the First-Comer method (a remarked device sends an arbitrary number to all devices placed in a network at a connection (or start) time, and it is declared that the arbitrary number is an address of the remarked device in cases where no response is received from the all devices) in the bus-type network. Therefore, in cases where the address of each device is linked to the systematic diagram, because an address of a device, to which data is sent, can be confirmed and stored in the first communication by tracing devices of a tree-type network, the device address can be used for the next communication. Therefore, the connection relationship of the devices can be easily grasped while seeing the systematic diagram, and the high-speed communication using the bus-type network can be performed by clicking each device. That is, as compared with the Ethernet currently used, no host is required in the network, it is not required to manually set an address of each device, and the communication environment can be automatically set,Therefore, the communication network using the electric power supply system can be conveniently utilized.

What is claimed is:

1. An electric power supply system, which is connected with consumption-side hardware consuming an electric power and supplies the electric power required by the consumption-side hardware to the consumption-side hardware, comprising two or more devices, which are connected with each other and are selected from a plurality of devices denoting power-side hardware, to supply an electric power obtained in one device of the electric power supply system to the consumption-side hardware according to electric power data which is received from the consumption-side hardware by using a communication function of the consumption-side hardware, wherein the power-side hardware comprises:

an electric power supply adapter, having a communication function and an electric power adjusting function, for receiving electric power data from one device or the consumption-side hardware, which is connected with the electric power supply adapter on an electric power output side of the electric power supply adapter, by using the communication function, converting an electric power, which is received from an outside of the electric power supply adapter, into another electric power according to the electric power data and outputting the converted electric power to the device or the consumption-side hardware;

an allotter, having a communication function and an electric power adjusting function, for receiving an electric power, which is required in the allotter, from one device connected with the allotter on an electric power input side of the allotter, receiving electric power data from one device or the consumption-side hardware, which is connected with the allotter on an electric power output side of the allotter, by using the communication function, converting the electric power into another electric power according to the electric power data and outputting the converted electric power to the device or the consumption-side hardware connected with the allotter on the electric power output side of the allotter; and a battery for supplying an electric power to the allotter.

2. An electric power supply system according to claim 1, wherein the devices of the power-side hardware are connected with each other through an electric cable, and the electric power supply system is connected with the consumption-side hardware through another electric cable.

3. An electric power supply system according to claim 2, wherein the electric power supply adapter comprises:

a communication unit for receiving the electric power data from the device connected with the electric power supply adapter;

a control unit for analyzing the electric power data received in the communication unit; and an electric power converting unit for converting the electric power supplied from the outside into another electric power specified by the electric power data according to an analysis result of the control unit.

4. An electric power supply system according to claim 2, wherein the allotter is connected with two or more devices of the power-side hardware on the electric power input side of the allotter, and the allotter comprises:

a communication unit for receiving the electric power data from the device connected with the allotter on the electric power output side of the allotter and transmitting electric power data to the devices connected with the allotter on the electric power input side of the allotter;

a control unit for analyzing the electric power data received in the communication unit;

two or more input electric power converting units for converting two or more electric powers, which are output from the devices connected with the allotter on the electric power input side of the allotter according to the electric power data sent from the allotter and are received from the devices, into second electric powers which are the same as each other; and an output electric power converting unit for converting the second electric powers converted in the input electric power converting units into a specified electric power according to an analysis result of the control unit.

5. An electric power supply system according to claim 2, wherein the consumption-side hardware comprises:

a communication unit for receiving and transmitting electric power data from and to the electric power supply system through a communication line; and a control unit for controlling the communication unit.

6. An electric power supply system according to claim 1, wherein the devices of the power-side hardware are connected with each other through an optical cable, the electric power supply system is connected with the consumption-side hardware through another optical cable, and a multiplexed wave of both an electric power wave carrying the electric power and a data wave denoting the electric power data passes through each of the optical cables.

7. An electric power supply system according to claim 6, wherein the electric power supply adapter comprises:

an optical communication unit for receiving a data wave denoting the electric power data from the device connected with the electric power supply adapter and converting the data wave into the electric power data;

a control unit for analyzing the electric power data obtained in the communication unit;

an electric power converting unit for converting the electric power supplied from the outside into an electric power data denoting a specified electric power according to an analysis result of the control unit; and an optical demultiplexing and multiplexing unit for demultiplexing the multiplexed wave transmitting through the optical cable to obtain the data wave and to send the data wave to the optical communication unit and multiplexing the electric power wave obtained in the electric power converting unit with a data wave output from the optical communication unit.

8. An electric power supply system according to claim 6, wherein the allotter comprises:

an optical communication unit for receiving a data wave denoting the electric power data from the device connected with the allotter on the electric power output side of the allotter and converting the data wave into the electric power data;

a control unit for analyzing the electric power data obtained in the communication unit;

an output electric power converting unit for converting an electric power wave received from the device into an electric power wave denoting a specified electric power according to an analysis result of the control unit; and an optical demultiplexing and multiplexing unit for demultiplexing the multiplexed wave transmitting through the optical cable to obtain the data wave and to send the data wave to the optical communication unit and multiplexing the electric power wave obtained in the output electric power converting unit with a data wave output from the optical communication unit.

9. An electric power supply system according to claim 6, wherein the consumption-side hardware comprises:

an optical demultiplexing and multiplexing unit for demultiplexing a multiplexed wave transmitting though the optical cable to obtain an electric power wave denoting the electric power and multiplexing a data wave denoting the electric power data with the multiplexed wave transmitting though the optical cable;

an optical communication unit for transmitting the data wave denoting the electric power data to the optical demultiplexing and multiplexing unit;

a control unit for controlling the communication unit; and an electric power converting unit for converting the electric power wave obtained in the optical demultiplexing and multiplexing unit into the electric power.

10. An electric power supply system according to claim 1, wherein the consumption-side hardware is connected with the electric power supply adapter, the electric power supply adapter converts the electric power received from the outside into an electric power according to the electric power data received from the consumption-side hardware, and the converted electric power is supplied to the consumption-side hardware.

11. An electric power supply system according to claim 1, wherein a battery having a communication function is connected with the electric power supply adapter, the electric power supply adapter converts the electric power received from the outside into an electric power according to electric power data received from the battery, and the converted electric power is supplied to the battery to charge the battery with the converted electric power.

12. An electric power supply system according to claim 1, wherein a plurality of devices of the consumption-side hardware are connected with the electric power supply adapter, the electric power supply adapter converts the electric power received from the outside into an electric power according to electric power data received from one device of the consumption-side hardware for each device, and the converted electric power is supplied to each corresponding device.

13. An electric power supply system according to claim 1, wherein a plurality of batteries are connected with the allotter on the electric power input side of the allotter, the consumption-side hardware is connected with the allotter on the electric power output side of the allotter, the allotter converts the electric powers received from the batteries into another electric power according to the electric power data received from the consumption-side hardware, and the converted electric power is supplied to the consumption-side hardware.

14. An electric power supply system according to claim 1, wherein a plurality of batteries are connected with the allotter on the electric power input side of the allotter, a plurality of devices of the consumption-side hardware are connected with the allotter on the electric power output side of the allotter, the allotter converts the electric powers received from the batteries into another electric power according to the electric power data received from each corresponding device of the consumption-side hardware, and the converted electric power is supplied to each corresponding device of the consumption-side hardware.

15. An electric power supply system according to claim 1, wherein the electric power supply adapter is connected with the allotter on the electric power input side of the allotter, a battery having a communication function is connected with the allotter on the electric power output side of the allotter, the allotter converts the electric powers received from the electric power supply adapter into another electric power according to the electric power data received from the battery, and the converted electric power is supplied to the battery to charge the battery.

16. An electric power supply system according to claim 1, wherein the battery is connected with the allotter on the electric power input side of the allotter, a second battery having a communication function is connected with the allotter on the electric power output side of the allotter, the allotter converts the electric powers received from the battery into another electric power according to electric power data received from the second battery, and the converted electric power is supplied to the second battery to charge the second battery.

17. An electric power supply system according to claim 1, wherein the power-side hardware further comprises:
  an additional allotter, having a communication function and an electric power adjusting function, for receiving an electric power, which is required in the additional allotter, from the allotter connected with the additional allotter on an electric power input side of the additional allotter, receiving electric power data from the consumption-side hardware, which is connected with the additional allotter on an electric power output side of the additional allotter, by using the communication function, converting the electric power into another electric power according to the electric power data and outputting the converted electric power to the consumption-side hardware; and
  a plurality of serial-additional allotters, respectively having a communication function and an electric power adjusting function, for respectively receiving an electric power, which is required in the serial-additional allotter of a current stage, from the allotter or the serial-additional allotter of a preceding stage connected with the serial-additional allotter of the current stage on an electric power input side of the serial-additional allotter of the current stage, receiving electric power data from the serial-additional allotter of a succeeding stage or the consumption-side hardware, which is connected with the serial-additional allotter of the current stage on an electric power output side of the serial-additional allotter of the current stage, by using the communication function, converting the electric power into another electric power according to the electric power data and outputting the converted electric power to the serial-additional allotter of the succeeding stage or the consumption-side hardware, the allotter is connected with the electric power supply adapter on the electric power input side of the allotter, the allotter is connected with the additional allotter or the serial-additional allotter of the first stage on the electric power output side of the allotter, the serial-additional allotter of a particular stage is connected with the consumption-side hardware on the electric power output side of the serial-additional allotter, the allotter converts an electric power received from the electric power supply adapter into another electric power according to electric power data received from the additional allotter or the serial-additional allotter of the first stage, and the electric power converted in the allotter is supplied to the additional allotter or the serial-additional allotter of the first stage, the additional allotter converts the electric power converted in the allotter into another electric power according to electric power data received from the consumption-side hardware in cases where the electric power converted in the allotter is supplied to the additional allotter, the electric power converted in the additional allotter is supplied to the consumption-side hardware, the serial-additional allotter of the current stage converts the electric power converted in the serial-additional allotter of the preceding stage into another electric power according to electric power data received from the serial-additional allotter of the succeeding stage or the consumption-side hardware in cases where the electric power converted in the allotter is supplied to the serial-additional allotter of the first stage, and the electric power converted in the serial-additional allotter of the current stage is supplied to the serial-additional allotter of the succeeding stage or the consumption-side hardware.

18. An electric power supply system according to claim 1, wherein the power-side hardware further comprises
  an additional allotter, having a communication function and an electric power adjusting function, for receiving an electric power, which is required in the additional allotter, from the allotter connected with the additional allotter on an electric power input side of the additional allotter, receiving electric power data from the consumption-side hardware, which is connected with the additional allotter on an electric power output side of the additional allotter, by using the communication function, converting the electric power into another electric power according to the electric power data and outputting the converted electric power to the consumption-side hardware, the allotter is connected with the electric power supply adapter and the battery on the electric power input side of the allotter, the allotter is connected with the additional allotter or the consumption-side hardware on the electric power output side of the allotter, the allotter requests the electric power supply adapter to output an electric power of which a voltage is equivalent to that of an electric power output from the battery, the allotter converts the electric powers supplied from both the electric power supply adapter and the battery into an electric power according to electric power data sent from the additional allotter or the consumption-side hardware, and the allotter supplies the electric power converted in the allotter to the additional allotter or the consumption-side hardware.

19. An electric power supply system according to claim 1, further comprises a connector for connecting the two or more devices of the power-side hardware, which are connected with each other, with the consumption-side hardware to supply an electric power from the power-side hardware to the consumption-side hardware according to electric power data which is transmitted from the consumption-side hardware to the power-side hardware by using the communication function of the consumption-side hardware, wherein the electric power supply system is fixedly arranged with the connector.

20. An electric-power supply system, which is connected with consumption-side hardware consuming an electric power and supplies the electric power required by the consumption-side hardware to the consumption-side hardware, comprising two or more devices, comprising:

one or a plurality of electric power supply adapters, respectively having a communication function using a communication network of a bus type connection, a communication function using an inter-adjacent communication of a tree type connection and an electric power adjusting function, for respectively receiving electric power data according to the communication function using the inter-adjacent communication, converting an electric power, which is received from an outside of the electric power supply adapter, into another electric power according to the electric power data and outputting the converted electric power; and one or a plurality of allotters, respectively having a communication function using the communication network, a communication function using the inter-adjacent communication and an electric power adjusting function, for respectively receiving an electric power, which is required in the allotter, through an electric power input side of the allotter, receiving electric power data through an electric power output side of the allotter according to the communication function using the inter-adjacent communication, converting the electric power into another electric power according to the electric power data and outputting the converted electric power, wherein the electric power supply adapters and the allotters are connected with a line of the communication network to function as a plurality of node apparatuses, each pair of the node apparatuses adjacent to each other are connected with each other through a line of the inter-adjacent communication, the consumption-side hardware functioning as a terminal apparatus is connected with a remarked node apparatus selected from the node apparatuses, a systematic diagram of the group of node apparatuses in the electric power supply system is prepared in the remarked node apparatus by using the inter-adjacent communication, and the remarked node apparatus specifies a communication route from the remarked node apparatus to each node apparatus, while grasping a position of each node apparatus arranged in the electric power supply system according to the systematic diagram, to communicate between the remarked node apparatus and each node apparatus.

* * * * *